(12) United States Patent
Zhang et al.

(10) Patent No.: US 12,514,958 B2
(45) Date of Patent: Jan. 6, 2026

(54) DEPOTS AND ENCASEMENT STRUCTURES FOR IMPLANTABLE DEVICES

(71) Applicant: ELUTIA MED LLC, Silver Spring, MD (US)

(72) Inventors: Ji Zhang, North Potomac, MD (US); Darryl Roberts, Doylestown, PA (US); Minh Vo, Sugar Hill, GA (US)

(73) Assignee: ELUTIA MED LLC, Silver Spring, MD (US)

( * ) Notice: Subject to any disclaimer, the term of this patent is extended or adjusted under 35 U.S.C. 154(b) by 1084 days.

(21) Appl. No.: 17/404,745

(22) Filed: Aug. 17, 2021

(65) Prior Publication Data

US 2022/0047777 A1     Feb. 17, 2022

Related U.S. Application Data

(60) Provisional application No. 63/066,402, filed on Aug. 17, 2020.

(51) Int. Cl.
    *A61L 27/54*      (2006.01)
    *A61L 27/28*      (2006.01)
    (Continued)

(52) U.S. Cl.
    CPC .............. *A61L 27/54* (2013.01); *A61L 27/28* (2013.01); *A61L 27/3629* (2013.01);
    (Continued)

(58) Field of Classification Search
    CPC ...... A61L 27/54; A61L 27/28; A61L 27/3629; A61L 27/3633; A61L 27/52; A61L 27/58;
    (Continued)

(56) References Cited

U.S. PATENT DOCUMENTS

| 4,902,508 A | 2/1990 | Badylak et al. |
| 5,275,826 A | 1/1994 | Badylak et al. |

(Continued)

FOREIGN PATENT DOCUMENTS

| CN | 102256609 A | 11/2011 |
| WO | 2000059379 A1 | 10/2000 |

(Continued)

OTHER PUBLICATIONS

Extended European Search Report for EP 21858982.8 mailed Sep. 10, 2024 (7 pages).

(Continued)

*Primary Examiner* — Sunita Reddy
(74) *Attorney, Agent, or Firm* — DLA Piper LLP (US)

(57) ABSTRACT

Encasement structures and methods of customizing patient drug delivery profiles using an encasement structure are described herein. Encasement structures can be configured to receive an implantable medical device and physicians can implant the medical devices within the encasement structures. Encasement structures can include at least one sheet of a bioscaffold material and one or more depots. Depots can be configured to release an active agent, such as an antibiotic, to the medical device within the encasement structure and/or the surrounding tissue. The depots can be insertable into or integrated with the at least one sheet of bioscaffold material.

19 Claims, 8 Drawing Sheets

(51) Int. Cl.
  *A61L 27/36* (2006.01)
  *A61L 27/52* (2006.01)
  *A61L 27/58* (2006.01)

(52) U.S. Cl.
  CPC ........... *A61L 27/3633* (2013.01); *A61L 27/52* (2013.01); *A61L 27/58* (2013.01); *A61L 2300/406* (2013.01)

(58) Field of Classification Search
  CPC ............... A61L 2300/406; A61L 27/18; A61L 27/3683; A61K 9/0024; A61K 9/7007; A61K 47/46
  USPC .................................................. 128/897–899
  See application file for complete search history.

(56) References Cited

U.S. PATENT DOCUMENTS

| | | | |
|---|---|---|---|
| 5,281,422 | A | 1/1994 | Badylak et al. |
| 5,352,463 | A | 10/1994 | Badylak et al. |
| 5,480,424 | A | 1/1996 | Cox |
| 5,554,389 | A | 9/1996 | Badylak et al. |
| 5,733,337 | A | 3/1998 | Carr, Jr. et al. |
| 6,206,931 | B1 | 3/2001 | Cook et al. |
| 6,358,284 | B1 | 3/2002 | Fearnot et al. |
| 6,379,710 | B1 | 4/2002 | Badylak |
| 6,689,153 | B1 | 2/2004 | Skiba |
| 6,719,788 | B2 | 4/2004 | Cox |
| 7,033,611 | B2 | 4/2006 | Lyngstadaas et al. |
| 7,244,444 | B2 | 7/2007 | Bates |
| 7,550,004 | B2 | 6/2009 | Bahler et al. |
| 8,753,885 | B1 | 6/2014 | Matheny |
| 8,753,886 | B1 | 6/2014 | Matheny |
| 8,758,448 | B2 | 6/2014 | Matheny |
| 8,785,197 | B1 | 7/2014 | Matheny |
| 8,785,198 | B1 | 7/2014 | Matheny |
| 8,871,511 | B1 | 10/2014 | Matheny et al. |
| 8,962,324 | B2 | 2/2015 | Matheny |
| 8,980,296 | B2 | 3/2015 | Matheny et al. |
| 9,044,319 | B2 | 6/2015 | Matheny |
| 9,066,993 | B2 | 6/2015 | Matheny |
| 9,072,816 | B2 | 7/2015 | Matheny |
| 9,161,952 | B2 | 10/2015 | Matheny et al. |
| 9,283,302 | B2 | 3/2016 | Matheny |
| 9,333,277 | B2 | 5/2016 | Matheny |
| 9,532,943 | B2 | 1/2017 | Matheny |
| 9,694,105 | B2 | 7/2017 | Matheny et al. |
| 9,744,264 | B2 | 8/2017 | Matheny |
| 10,143,778 | B2 | 12/2018 | Matheny |
| 10,159,764 | B2 | 12/2018 | Matheny |
| 10,293,084 | B2 | 5/2019 | Matheny |
| 10,383,977 | B2 | 8/2019 | Matheny |
| 10,512,710 | B2 | 12/2019 | Matheny |
| 10,744,163 | B2 | 8/2020 | Matheny |
| 10,864,233 | B2 | 12/2020 | Matheny |
| 11,045,580 | B2 | 6/2021 | Matheny |
| 2003/0014126 | A1 | 1/2003 | Patel et al. |
| 2003/0036797 | A1 | 2/2003 | Malaviya et al. |
| 2005/0013870 | A1 | 1/2005 | Freyman et al. |
| 2005/0124560 | A1 | 6/2005 | Sung et al. |
| 2005/0181016 | A1 | 8/2005 | Freyman et al. |
| 2006/0039896 | A1 | 2/2006 | Kleinsek et al. |
| 2006/0136028 | A1 | 6/2006 | Ross et al. |
| 2006/0147492 | A1 | 7/2006 | Hunter et al. |
| 2006/0161265 | A1 | 7/2006 | Levine et al. |
| 2006/0204738 | A1 | 9/2006 | Dubrow et al. |
| 2006/0206139 | A1 | 9/2006 | Tekulve |
| 2007/0014868 | A1 | 1/2007 | Matheny |
| 2007/0014869 | A1 | 1/2007 | Matheny |
| 2007/0014870 | A1 | 1/2007 | Matheny |
| 2007/0014871 | A1 | 1/2007 | Matheny |
| 2007/0014872 | A1 | 1/2007 | Matheny et al. |
| 2007/0014873 | A1 | 1/2007 | Matheny |
| 2007/0014874 | A1 | 1/2007 | Matheny |
| 2007/0166396 | A1 | 7/2007 | Badylak et al. |
| 2007/0168021 | A1 | 7/2007 | Holmes et al. |
| 2007/0208420 | A1 | 9/2007 | Ameer et al. |
| 2008/0125851 | A1 | 5/2008 | Kilpatrick et al. |
| 2008/0132922 | A1 | 6/2008 | Buevich et al. |
| 2008/0175980 | A1 | 7/2008 | Sun |
| 2008/0199507 | A1 | 8/2008 | Skarja et al. |
| 2008/0274184 | A1 | 11/2008 | Hunt |
| 2008/0281418 | A1 | 11/2008 | Firestone |
| 2009/0130162 | A2 | 5/2009 | Pathak et al. |
| 2009/0138074 | A1 | 5/2009 | Freyman et al. |
| 2009/0163951 | A1 | 6/2009 | Simmons et al. |
| 2009/0196910 | A1 | 8/2009 | Yie et al. |
| 2009/0204228 | A1 | 8/2009 | Hiles |
| 2009/0263453 | A1 | 10/2009 | McKay et al. |
| 2009/0306688 | A1 | 12/2009 | Patel et al. |
| 2010/0028396 | A1 | 2/2010 | Ward et al. |
| 2010/0030292 | A1 | 2/2010 | Sarkar et al. |
| 2010/0047305 | A1 | 2/2010 | Naughton et al. |
| 2010/0168808 | A1 | 7/2010 | Citron |
| 2010/0222882 | A1 | 9/2010 | Badylak et al. |
| 2010/0233235 | A1 | 9/2010 | Matheny et al. |
| 2010/0239632 | A1 | 9/2010 | Walsh |
| 2010/0262221 | A1 | 10/2010 | Schafer et al. |
| 2010/0266654 | A1 | 10/2010 | Hodde et al. |
| 2011/0077455 | A1 | 3/2011 | Duncan et al. |
| 2011/0166673 | A1 | 7/2011 | Patel et al. |
| 2012/0016491 | A1* | 1/2012 | Matheny ............. A61L 27/3679 623/23.72 |
| 2012/0034191 | A1 | 2/2012 | Matheny |
| 2012/0100185 | A1 | 4/2012 | Wen et al. |
| 2012/0183987 | A1 | 7/2012 | Gevaert et al. |
| 2012/0302499 | A1 | 11/2012 | Matheny |
| 2013/0023721 | A1* | 1/2013 | Matheny ................ A61P 31/00 600/16 |
| 2013/0122108 | A1 | 5/2013 | Matheny |
| 2013/0126188 | A1 | 5/2013 | Quitberg |
| 2013/0144356 | A1 | 6/2013 | Horn et al. |
| 2014/0023723 | A1 | 1/2014 | Leach et al. |
| 2014/0088339 | A1 | 3/2014 | Matheny |
| 2014/0148897 | A1 | 5/2014 | Matheny |
| 2014/0205565 | A1 | 7/2014 | Matheny |
| 2014/0249623 | A1 | 9/2014 | Matheny |
| 2014/0315847 | A1* | 10/2014 | Peck ..................... A61L 31/005 514/40 |
| 2014/0342984 | A1 | 11/2014 | Matheny |
| 2014/0343673 | A1* | 11/2014 | Matheny ............ A61N 1/37512 623/3.29 |
| 2015/0093353 | A1 | 4/2015 | Matheny |
| 2015/0100115 | A1 | 4/2015 | Matheny |
| 2015/0335787 | A1 | 11/2015 | Matheny |
| 2015/0352145 | A1 | 12/2015 | Matheny |
| 2015/0352257 | A1 | 12/2015 | Early |
| 2015/0359942 | A1 | 12/2015 | Matheny et al. |
| 2016/0008514 | A1 | 1/2016 | Jones |
| 2016/0082153 | A1 | 3/2016 | Matheny |
| 2016/0082154 | A1 | 3/2016 | Matheny |
| 2017/0360544 | A1 | 12/2017 | Ward et al. |
| 2018/0098836 | A1 | 4/2018 | Lee et al. |
| 2018/0272136 | A1 | 9/2018 | Horn et al. |
| 2019/0224368 | A1 | 7/2019 | Matheny |
| 2019/0314551 | A1 | 10/2019 | Matheny |
| 2020/0139011 | A1 | 5/2020 | Vo et al. |
| 2020/0368393 | A1 | 11/2020 | Matheny |
| 2020/0397945 | A1 | 12/2020 | Matheny |
| 2022/0211907 | A1 | 7/2022 | Matheny |
| 2023/0026971 | A1 | 1/2023 | Matheny |
| 2025/0228999 | A1 | 7/2025 | Matheny |

FOREIGN PATENT DOCUMENTS

| | | |
|---|---|---|
| WO | 2002067895 A2 | 9/2002 |
| WO | 2004110427 A1 | 12/2004 |
| WO | 2005097219 A2 | 10/2005 |
| WO | 2007011644 A2 | 1/2007 |
| WO | 2010014021 A1 | 2/2010 |
| WO | 2010096458 A1 | 8/2010 |
| WO | 2012018680 A1 | 2/2012 |
| WO | 2014046741 A1 | 3/2014 |

(56) References Cited

FOREIGN PATENT DOCUMENTS

| WO | 2014046744 A1 | 3/2014 |
|---|---|---|
| WO | 2014046752 A1 | 3/2014 |
| WO | 2014046753 A2 | 3/2014 |
| WO | 2014144188 A1 | 9/2014 |
| WO | 2016022250 A1 | 2/2016 |
| WO | 2016093863 A1 | 6/2016 |
| WO | 2018017611 A1 | 1/2018 |

OTHER PUBLICATIONS

International Search Report and Written Opinion for International PCT Application No. PCT/US2021/046335 dated Nov. 29, 2021.
Badylak et al., "Extracellular Matrix for Myocardial Repair," Heart Surg Forum 6, E20-26 (2003).
Badylak, "Xenogeneic extracellular matrix as a scaffold for tissue reconstruction," Transplant Immunology, 12:367-377 (2004).
Gilbert et al., Journal of Surgical Research, vol. 152, pp. 135-139.
International Search Report and Written Opinion for International PCT Patent Application No. PCT/US2019/058681 dated Jan. 27, 2020.
Lindsey et al., "Extracellular Matrix Remodeling Following Myocardial Injury," Ann Med 35, 316-326 (2003).
Robinson et al., "Extracellular Matrix Scaffold for Cardiac Repair," Circulation 112, 1135-143 (2005).
Cottagnoud "Vancomycin Acts Synergistically with Gentamicin against Penicillin-Resistant Pneumococci by Increasing the Intracellular Penetration of Gentamicin" Jan. 2003, Antimicrob Agents Chemother. 47(1): 144-147.
Hoganson et al. "Preserved Extracellular Matrix Components and Retained Biological Activity in Decellularized Porcine Mesothelium" Sep. 2010, Biomaterials 31(27):6934-6940, XP027124625.
International Search Report and Written Opinion for PCT/US2011/064115 dated Apr. 24, 2012, 10 Pages.
Kumagai et al. "The Hmg-Coa Reductase Inhibitor Atorvastatin Prevents Atrial Fibrillation by Inhibiting Inflammation in a Canine Sterile Pericarditis Model" Apr. 1, 2004, Cardiovascular Research 62(1):105-111, doi:10.1016/J.CARDIORES.2004.01.018, ISSN 0008-6363, XP008036414.
Rai et al. "Synthesis, Properties And Biomedical Applications Of Poly(Glycerol Sebacate) (Pgs): A Review" Feb. 4, 2012, Progress in Polymer Science, 37:1051-1078.
Shandling et al. "Dacron-Woven Pacemaker Pouch-Influence on Long-term Pacemaker Mobility Chest" Mar. 1991, Chest 99(3):660-662.
Temple University Health System; "Stem cell exosomes used to induce damaged mouse hearts to self-repair", ScienceDaily Jun. 18, 2015. www.sciencedaily.com/releases/2015/06/150618122104.htm.
Ty Rx Pharma Aigis Rx: "Antibacterial Envelope Informational Brochure" 2012, 4 Pages.
European Examination Report for Application No. EP 21858982.8 dated Aug. 21, 2025.

\* cited by examiner

DEPOTS AND ENCASEMENT STRUCTURES FOR IMPLANTABLE DEVICES

CROSS-REFERENCE TO RELATED APPLICATIONS

This application claims priority to and the benefit of U.S. Provisional Application No. 63/066,402, filed Aug. 17, 2020, which is incorporated herein by reference in its entirety.

TECHNICAL FIELD

The present disclosure relates generally to methods, systems, and apparatuses for bioabsorbable encasement structures for implantable medical devices. In particular, the present disclosure relates generally to depots disposed on bioabsorbable encasement structures.

BACKGROUND

Treatment of a medical condition occasionally involves implantation of a medical device in a subject to monitor and/or control various physiological functions of the subject. For example, a pacemaker is often utilized to control abnormal heart rhythms. Implantation of a medical device (or other devices, e.g., tracking apparatuses) within the body has risks and often is accompanied by adverse side effects related to the presence of a foreign object, such as inflammation of the tissue surrounding the implant, infection, and thrombogenesis. To help mitigate these risks, a medical device can be implanted in an encasement structure, which may help reduce harsh biological responses associated with implantation. Some encasement structures are coated in an antibiotic or other active agent to help mitigate risk even further.

However, the inclusion of an active agent as a coating has several drawbacks, including a technically challenging and sometimes cumbersome fabrication process and shelf life. Further, should a surgeon wish to alter or add additional active agents to aid in implantation, doing so is difficult, if not impossible. Accordingly, there is a need for encasement structures for implantable medical devices that address these issues.

SUMMARY

In one aspect, the present disclosure provides an encasement structure comprising: at least one sheet comprising a bioscaffold material, the at least one sheet configured to define an internal region that is sized and shaped to hold an implantable medical device therein; and one or more depots associated with the at least one sheet, wherein the one or more depots comprise an effective amount of one or more active agents and a bioabsorbable material, and are configured to release the active agent over a period of time.

The bioscaffold material may comprise decellularized extracellular matrix (ECM), which may further be acellular or substantially acellular. In any embodiment, the ECM may be derived from mammalian tissue, such as from one or more of small intestine submucosa (SIS); urinary bladder submucosa (UBS); stomach submucosa (SS); central nervous system tissue; other tissue of mesodermal origin (e.g., mesothelial tissue); dermal tissue; subcutaneous tissue; gastrointestinal tissue (e.g., of the large or small intestine tissue); tissue surrounding growing bone; placental tissue; omentum tissue; cardiac tissue (e.g., pericardium and/or myocardium tissue); kidney tissue; pancreatic tissue; lung tissue; or any combination thereof. In any embodiment, for example, the bioscaffold material may comprise small intestine submucosa.

The one or more depots of the encasement structure may comprise one or more of a bioabsorbable polymer or hydrogel. For example, the one or more depots may comprise a copolymer of lactic acid and glycolic acid.

In any embodiment, the encasement structure may comprise two or more laminae of bioscaffold material, such as four laminae of bioscaffold material. In any embodiment, the encasement structure may be configured to receive and secure the one or more depots between two laminae of the bioscaffold material.

The one or more depots may comprise one or more active agents, for example, one or more antibiotics, antifungal agents, anti-viral agents, anti-pain agents, anesthetics, analgesics, steroidal anti-inflammatories, non-steroidal anti-inflammatories, anti-neoplastics, anti-spasmodics, hormones, enzymes, enzyme inhibitors, anticoagulants, antithrombic agents, polypeptides, oligonucleotides, polynucleotides, nucleoproteins, compounds modulating cell migration, compounds modulating proliferation and/or growth of tissue, vasodilating agents, anti-hematoma agents, anti-scarring agents, or any combination thereof. The one or more depots may release the one or more active agents over a period of time of about 1 week to about 3 months, or longer, such as up to 6 months, 9 months, or a year. In any embodiment, the one or more depots comprise one or more antibiotics, such as rifampin, minocycline, gentamicin, or vancomycin. The one or more antibiotics may be incorporated in any therapeutically effective amount, such as about 5 mg to about 20 mg.

In another aspect, the present disclosure provides a kit comprising: one or more encasement structures, each encasement structure comprising: at least one sheet comprising a bioscaffold material, the at least one sheet configured to define an internal region that is sized and shaped to hold an implantable medical device therein; and one or more depots comprising one or more active agents and a bioabsorbable material, wherein the one or more depots are configured to release the one or more active agents over a period of time; wherein the encasement structure is configured to receive, and associate securely therewith, the one or more depots.

The bioscaffold material may comprise decellularized extracellular matrix (ECM), which may further be acellular or substantially acellular. In any embodiment, the ECM may be derived from mammalian tissue, such as from one or more of small intestine submucosa (SIS); urinary bladder submucosa (UBS); stomach submucosa (SS); central nervous system tissue; other tissue of mesodermal origin (e.g., mesothelial tissue); dermal tissue; subcutaneous tissue; gastrointestinal tissue (e.g., of the large or small intestine tissue); tissue surrounding growing bone; placental tissue; omentum tissue; cardiac tissue (e.g., pericardium and/or myocardium tissue); kidney tissue; pancreatic tissue; lung tissue; or any combination thereof. In any embodiment, for example, the bioscaffold material may comprise small intestine submucosa.

The one or more depots of the encasement structure may comprise one or more of a bioabsorbable polymer or hydrogel. For example, the one or more depots may comprise a copolymer of lactic acid and glycolic acid.

In any embodiment, the encasement structure may comprise two or more laminae of bioscaffold material, such as four laminae of bioscaffold material. In any embodiment, the encasement structure may be configured to receive and secure the one or more depots between two laminae of the bioscaffold material.

The one or more depots may comprise one or more active agents, for example, one or more antibiotics, antifungal agents, anti-viral agents, anti-pain agents, anesthetics, analgesics, steroidal anti-inflammatories, non-steroidal anti-inflammatories, anti-neoplastics, anti-spasmodics, hormones, enzymes, enzyme inhibitors, anticoagulants, antithrombic agents, polypeptides, oligonucleotides, polynucleotides, nucleoproteins, compounds modulating cell migration, compounds modulating proliferation and/or growth of tissue, vasodilating agents, anti-hematoma agents, anti-scarring agents, or any combination thereof. The one or more depots may release the one or more active agents over a period of time of several days, or about 1 week to about 3 months, or longer, such as up to 6 months, 9 months, or a year. In any embodiment, the one or more depots comprise one or more antibiotics, such as rifampin, vancomycin, gentamicin, and minocycline. The one or more antibiotics may be incorporated in any therapeutically effective amount, such as about 5 mg to about 20 mg.

In yet another aspect, the present disclosure provides a method of reducing a risk of an adverse effect associated with implanting a medical device in a subject in need thereof, the method comprising: inserting the medical device into an encasement structure, the encasement structure comprising at least one sheet comprising a bioscaffold material, the at least one sheet configured to define an internal region that is sized and shaped to hold the medical device therein; applying one or more depots to the encasement structure to form an encased medical device; and implanting the encased medical device into the subject.

The bioscaffold material may comprise decellularized extracellular matrix (ECM), which may further be acellular or substantially acellular. In any embodiment, the ECM may be derived from mammalian tissue, such as from one or more of small intestine submucosa (SIS); urinary bladder submucosa (UBS); stomach submucosa (SS); central nervous system tissue; other tissue of mesodermal origin (e.g., mesothelial tissue); dermal tissue; subcutaneous tissue; gastrointestinal tissue (e.g., of the large or small intestine tissue); tissue surrounding growing bone; placental tissue; omentum tissue; cardiac tissue (e.g., pericardium and/or myocardium tissue); kidney tissue; pancreatic tissue; lung tissue; or any combination thereof. In any embodiment, for example, the bioscaffold material may comprise small intestine submucosa.

The one or more depots of the encasement structure may comprise one or more of a bioabsorbable polymer or hydrogel. For example, the one or more depots may comprise a copolymer of lactic acid and glycolic acid.

In any embodiment, the encasement structure may comprise two or more laminae of bioscaffold material, such as four laminae of bioscaffold material. In any embodiment, the encasement structure may be configured to receive and secure the one or more depots between two laminae of the bioscaffold material.

The one or more depots may comprise one or more active agents, for example, one or more antibiotics, antifungal agents, anti-viral agents, anti-pain agents, anesthetics, analgesics, steroidal anti-inflammatories, non-steroidal anti-inflammatories, anti-neoplastics, anti-spasmodics, hormones, enzymes, enzyme inhibitors, anticoagulants, antithrombic agents, polypeptides, oligonucleotides, polynucleotides, nucleoproteins, compounds modulating cell migration, compounds modulating proliferation and/or growth of tissue, vasodilating agents, anti-hematoma agents, anti-scarring agents, or any combination thereof. The one or more depots may release the one or more active agents over a period of time of about 1 week to about 3 months, or longer, such as up to 6 months, 9 months, or a year. In any embodiment, the one or more depots comprise one or more antibiotics, such as rifampin, gentamicin, vancomycin, and minocycline. The one or more antibiotics may be incorporated in any therapeutically effective amount, such as about 5 mg to about 20 mg.

According to the methods disclosed herein, the one or more depots may be chemically or mechanically applied to the encasement structure prior to implantation.

The methods disclosed herein may be effective at reducing or preventing one or more adverse effects selected from infection (bacterial, viral, or fungal), pain, swelling, inflammation, hematoma, scarring, vasoconstriction, and rejection of the medical device and/or encasement device.

BRIEF DESCRIPTION OF THE DRAWINGS

The accompanying drawings, which are incorporated into and form a part of the specification, illustrate various exemplary embodiments of the invention and together with the written description serve to explain principles, characteristics, and features of the invention. In the drawings.

DETAILED DESCRIPTION

Figure 1A:
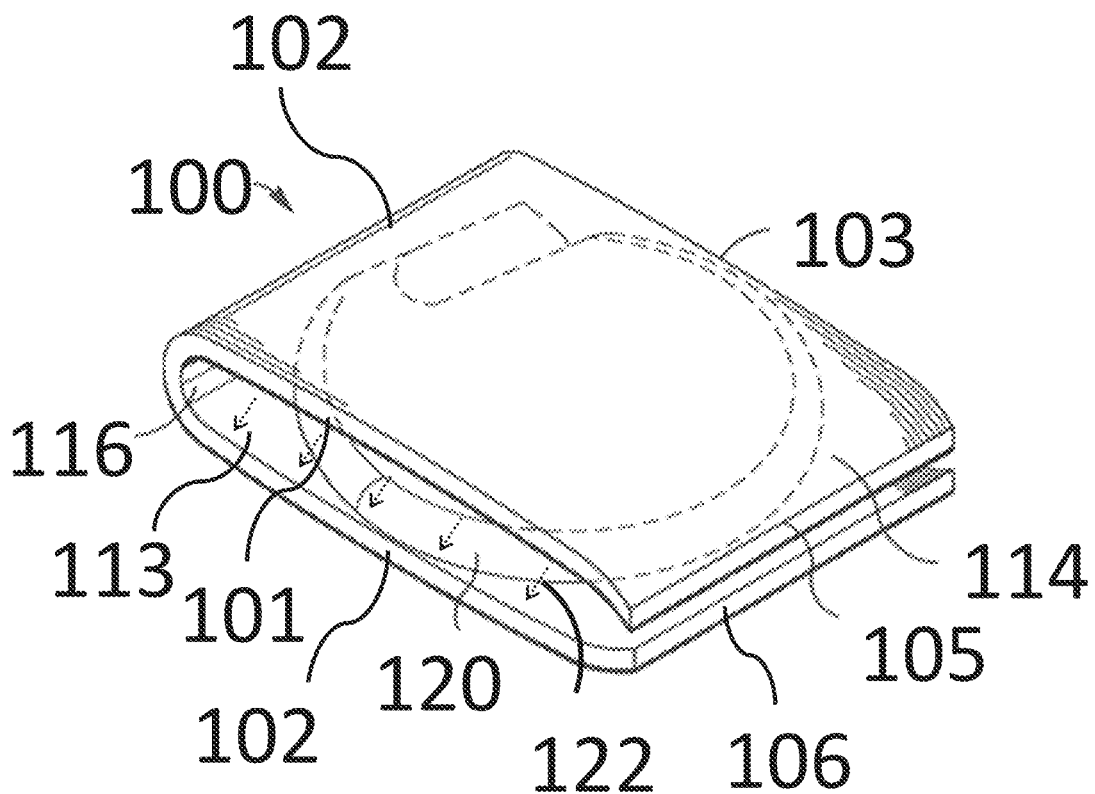
FIG. 1A provides a three-dimensional perspective view of one embodiment of an encasement structure and a medical device contained therein.

The invention, of which various aspects and embodiments are described herein, is not limited strictly to the particular systems, devices, and methods described, as these may vary. The terminology used in the description is for the purpose of describing various aspects and embodiments only and does not limit the scope of the invention, which is limited only by the appended claims.

As used herein, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the term "about" when immediately preceding a numerical value means a range of plus or minus 10% of that value, e.g., "about 50" means 45 to 55, "about 25,000" means 22,500 to 27,500, unless the context of the disclosure indicates otherwise, or is inconsistent with such an interpretation.

The transitional term "comprising," which is synonymous with "including," "containing," or "characterized by," is inclusive or open-ended and does not exclude additional, non-recited elements or method steps. As used in this document, the term "comprising" means "including, but not limited to." In contrast, the transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. In embodiments or claims where the term comprising is used as the transition phrase, such embodiments can also be envisioned with replacement of the term "comprising" with the terms "consisting of" or "consisting essentially of."

The terms "active agent," "drug," and "active pharmaceutical ingredient" are used interchangeably herein, and mean and include an agent, drug, compound, composition of matter or mixture thereof, including its formulation, which provides some therapeutic, often beneficial, effect. This includes any physiologically or pharmacologically active substance that produces a localized or systemic effect or effects in animals, including warm blooded mammals, humans and primates; avian; domestic household or farm animals, such as cats, dogs, sheep, goats, cattle, horses and pigs; laboratory animals, such as mice, rats and guinea pigs; fish; reptiles; zoo and wild animals; and the like.

The terms "subject," "individual," and "patient" are used interchangeably and as used herein are intended to include human and non-human animals. Non-human animals include all vertebrates, e.g., mammals and non-mammals, such as non-human primates, sheep, dogs, cats, cows, horses, chickens, amphibians, and reptiles, although mammals are preferred, such as non-human primates, sheep, dogs, cats, cows and horses. Preferred subjects include humans in need of treatment. The methods are particularly suitable for treating humans having a disease or disorder described herein.

The term "effective therapeutic amount," as used herein, describes an amount of, e.g., an active agent that, when administered, improves or ameliorates one or more causes, symptoms, or sequelae of a disease, condition, or disorder. Such amelioration only requires a reduction or alteration, not necessarily elimination, of the cause, symptom, or sequelae of a disease, condition, or disorder. For example, an effective therapeutic amount of an active agent that may be used herein may be effective to reduce or inhibit an inflammatory or immune response against a medical device implanted in a subject through incorporating the effective therapeutic amount of the active agent together with the implanted device.

As used herein the terms "treat," "treated," "treating," or any grammatical variation thereof, refer to both retroactive to disease, disorder, or condition onset to slow or reverse disease progression and/or reduce, slow, or reverse symptoms thereof as well as preceding disease, disorder, or condition onset in a prophylactic manner to inhibit or slow down onset or subsequent progression of a condition, disorder or disease. Treatment, may, in any embodiment, result in beneficial or desired clinical results such as partial or total restoration of a non- or lessened disease, disorder, or state of condition or inhibition in decline of normal function or symptoms. Beneficial or desired clinical results include, but are not limited to, alleviation of symptoms; diminishment of the extent or vigor or rate of development of the condition, disorder or disease; stabilization (i.e., not worsening) of a state of the condition, disorder or disease; delay in onset or slowing of the progression of the condition, disorder or disease; amelioration of the condition, disorder, or disease; remission (partial or total which may or may not translate to immediate lessening of actual clinical symptoms or enhancement or improvement of the condition, disorder or disease); and any combination thereof. In any embodiment, a treatment may elicit a clinically significant response without excessive levels of adverse or side effects.

Encasement Structures

The present disclosure provides various embodiments of an encasement structure which may be used for encasing medical devices prior to implantation into a body. In particular, provided herein is an encasement structure comprising: at least one sheet comprising a bioscaffold material, the at least one sheet configured to define an internal region that is sized and shaped to hold an implantable medical device therein; and one or more depots associated with the at least one sheet; wherein the one or more depots comprise an effective amount of one or more active agents and a bioabsorbable material, and are configured to release the one or more active agents in vivo over a period of time (i.e., a release period). For example, in any embodiment, the one or more depots may comprise an effective amount of one or more of an antibiotic, antifungal agent, anti-viral agent, anti-pain agent, anesthetic, analgesic, steroidal anti-inflammatory, non-steroidal anti-inflammatory, anti-neoplastic, anti-spasmodic, hormone, enzyme, enzyme inhibitor, anti-coagulant, antithrombic agent, polypeptides, oligonucleotide, polynucleotide, nucleoprotein, cell migration-modulating compound, tissue proliferation and/or growth-modulating compound, vasodilating agent, anti-hematoma agent, and anti-scarring agent.

In any embodiment described herein, an encasement structure may be provided in any shape or size, depending on its desired end use. For example, in any embodiment, an encasement structure may be provided as a pouch, bag, covering, shell, skin, receptacle, or any like structure to accommodate any shape and size of medical device. Non-limiting examples of medical devices and associated components that may be encased or otherwise associated with an encasement structure and disclosed herein include, without limitation, a pacemaker, defibrillator, a neurostimulator, a pain pump, an infusion pump, a synthetic heart valve, a ventricular assist device, an artificial heart, a physiological sensor, a catheter, and any and all electrical leads and lines associated with any aforementioned or other medical devices.

In one example, an encasement structure is provided as a pocket or pouch ("pouch encasement structure") comprising at least one sheet of bioscaffold material configured to provide an internal region for receiving and holding a medical device therein. In any embodiment, an entire medical device may be encased within a pouch encasement structure. Alternatively, only a portion of a medical device may be encased in an encasement structure comprising the at least one sheet of bioscaffold material. For example, in any embodiment, a device housing and a portion of the device leads may be encased in a pouch encasement structure comprising at least one sheet of a bioscaffold material.

In any embodiment, the at least one sheet of a bioscaffold material may comprise one or more bioscaffold materials. Each sheet may comprise the same or a different bioscaffold material. The bioscaffold material may comprise one or more synthetic or a naturally-occurring materials provided that such materials are biocompatible, are capable of being formed into a three-dimensional structure, and/or permit the migration of cells throughout the material or otherwise promote the formation of new tissue when implanted into a subject. For example, in any embodiment, the one or more bioscaffold materials may comprise one or more bioabsorbable polymers such as, but not limited to, poly(L-lactic acid), polycaprolactone, poly(lactide-co-glycolide), poly(hydroxybutyrate), poly(hydroxybutyrate-co-valerate), polydioxanone, a polyorthoester, a polyanhydride, poly(glycolic acid), poly(D,L-lactic acid), poly(glycolic acid-co-trimethylene carbonate), a polyhydroxyalkanoate, a polyphosphoester, a polyphosphoester urethane, a poly(amino acid), a cyanoacrylate, a poly(trimethylene carbonate), poly(iminocarbonate), a copoly(ether-ester) such as PEO/PLA, a polyalkylene oxalate, or a polyphosphazene. Suitable materials include both bioabsorbable and non-bioabsorbable materials (e.g., biostable materials).

In any embodiment, a bioscaffold material may additionally comprise one or more non-bioresorbable/non-bioabsorbable (e.g., biostable) polymers such as, but not limited to, polytetrafluoroethylene (PTFE) (including expanded PTFE); polyethylene terephthalate (PET); polyurethane; silicon; a polyester; a polyolefin; a polyisobutylene and ethylene-alpha-olefin copolymer; an acrylic polymer or copolymer; a vinyl halide polymer or copolymer (such as polyvinyl chloride); a polyvinyl ether such as polyvinyl methyl ether; a polyvinylidene halide such as polyvinylidene fluoride and polyvinylidene chloride; a polyacrylonitrile, polyvinyl ketone; a polyvinyl aromatic such as polystyrene or a polyvinyl ester (e.g., polyvinyl acetate); a copolymer of one or more vinyl monomers and one or more olefins such as an ethylene-methyl methacrylate copolymer, acrylonitrile-styrene copolymer, ABS resins, or ethylene-vinyl acetate copolymers; a polyamide such as poly(azanediyladipoylazanediylhexane-1,6-diyl) (Nylon 66) or polycaprolactam (Nylon 6); an alkyd resin; a polycarbonate; a polyoxymethylene; a polyimide; a polyether; an epoxy resin; rayon; and rayon-triacetate.

In any embodiment, a bioscaffold material may comprise tissue derived from one or more animals, such as a collagenous extracellular matrix (ECM) material. Animal tissue may be subjected to a decellularization process and may therefore be at least partially decellularized. The terms "extracellular matrix," "ECM," "ECM material," and any grammatical variations thereof are used interchangeably herein and used to describe a collagen-rich substance that is found in between cells in mammalian tissue or any material processed therefrom. For example, ECM may be decellularized ECM and/or acellular ECM, derived from a decellularized mammalian tissue source. The term "decellularized" as used herein, refers to a material, e.g., a tissue, that has been subjected to a process that has removed at least some of the cells therein. Such a material may have about 70%, 80%, 90%, 95%, 99%, 99.9% or 99.999% of the cells remaining from the starting material. The term "acellular" or "substantially acellular," as used herein, refers to a material comprising no detectable cells (human or non-human animal) or substantially no (e.g., less than 20%, less than 15%, less than 10%, less than 5%, less than 4%, less than 2%, less than 1%, less than 0.5%, or less than 0.01% by weight) of detectable cells (human or non-human animal). Such a material may be prepared by subjecting cellular material to a decellularization process that removes all or substantially all the cells therein. Alternatively, a decellularized or acellular ECM may be prepared synthetically by cells in culture. The cells may then be fully or partially removed to generate decellularized or acellular ECM.

For example, in any embodiment, a bioscaffold material may comprise ECM derived from any mammalian tissue source, including without limitation, small intestine submucosa (SIS; urinary bladder submucosa (UBS); stomach submucosa (SS); central nervous system tissue; other tissue of mesodermal origin (e.g., mesothelial tissue); dermal tissue; subcutaneous tissue; gastrointestinal tissue (e.g., of the large or small intestine tissue); tissue surrounding growing bone; placental tissue; omentum tissue; cardiac tissue (e.g., pericardium and/or myocardium tissue); kidney tissue; pancreatic tissue; lung tissue; and any combination thereof. In any embodiment, ECM suitable for use in an encasement structure, as described herein, may comprise collagen from one or more mammalian sources. The collagen may be endogenous to the tissue from which the ECM is derived or may be sourced from one or more sources non-native to the ECM. As used herein, "urinary bladder submucosa (UBS)," "small intestine submucosa (SIS)," and "stomach submucosa (SS)" refer to any UBS, SIS, and SS material (respectively) and may include one or more of the tunica mucosa (including transitional epithelial layer and tunica propria), submucosal layer, one or more layers of muscularis, and adventitia (a loose connective tissue layer) associated therewith.

In another example, and in any embodiment, a bioscaffold material may additionally or alternatively comprise ECM derived from basement membrane of mammalian tissue/organs, including and without limitation, urinary basement membrane (UBM), liver basement membrane (LBM), amnion, chorion, allograft pericardium, allograft acellular dermis, amniotic membrane, Wharton's jelly, and any combination thereof. Additional sources of mammalian basement membrane include, without limitation, spleen, lymph nodes, salivary gland, prostate, pancreas, and other secreting glands. In any embodiment, a bioscaffold material may additionally or alternatively comprise ECM derived from other sources, including, without limitation, plants and synthesized extracellular matrices, as described above.

ECM of any thickness may be utilized in an encasement structure, as described herein. For example, an as-isolated layer of ECM (e.g., submucosa when fully hydrated) may exhibit a thickness of about 50 μm to about 500 such as about 50 μm to about 400 about 50 μm to about 300 or about 50 μm to about 200 Isolated ECM exhibiting a thickness outside these recited ranges, however, may also be obtained and used, as ECM thickness may vary with the type and age of the source animal and the location of the tissue within the animal.

In any embodiment, an encasement structure, such as a pouch encasement structure, may be made from at least one sheet of a bioscaffold material, the bioscaffold material comprising at least one layer (or lamina) of ECM. For example, an encasement structure may be made from a bioscaffold material comprising one, two, three, four, five, six, or seven laminae of ECM. Each lamina of ECM may be derived from the same tissue type and/or animal or may be derived from different tissue types and/or animals. For example, in any embodiment, an encasement structure may a sheet made from multiple laminae of submucosa-derived ECM (such as SIS).

As described above, an encasement structure, as disclosed herein, has associated therewith one or more depots. As such, an encasement structure, such as a pouch encasement structure, may comprise one or more elements that facilitate association of the one or more depots therewith, such as one or more pockets, which may be located anywhere in or on the encasement structure such as within the internal region or on the outside of the encasement structure. Additionally or alternatively, in any embodiment, a sheet of bioscaffold material comprising two or more laminae may not be joined together at one or more edges of the laminae, effectively creating a pocket into which one or more depots may be inserted. For example, in any embodiment, an encasement structure may be formed from two or more mono- or bilayer sheets of bioscaffold material configured to receive and secure one or more depots between the first mono- or bilayer sheet and the second bilayer sheet. Alternatively, an encasement structure may not include any element that specifically facilitates associate of one or more depots therewith, but rather one or more depots may be simply inserted into the internal region of the encasement structure together with the one or more objects, such as with a medical device.

Figure 1B:
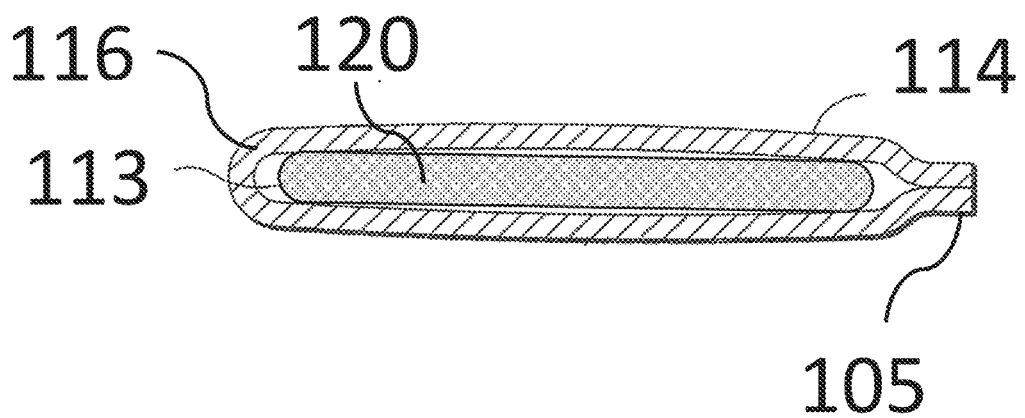
FIG. 1B provides a side view of the embodiment shown in FIG. 1A.

FIG. 1A depicts a perspective view of one embodiment of an encasement structure 100 that is configured to receive and hold one or more objects 120 such as medical device (e.g., a pacemaker), a composition, or any combination thereof, therein. The encasement structure 100 includes at least one sheet of a bioscaffold material 114. The at least one sheet of bioscaffold material 114 may comprise one or more laminae, as described above. The pouch-like structure can be configured to receive and hold the one or more objects 120 therein. FIG. 1B shows a side view of the embodiment shown in FIG. 1A.

In one embodiment, the at least one sheet of bioscaffold material 114 may be folded, as shown in FIG. 1A, to form a folded edge 116. One or more additional edges, e.g., edges 101 and 102, may be joined together (represented by arrows 122) to create a pouch like structure. Edges of the at least one sheet of bioscaffold material 114 may be joined via mode of lamination, biocompatible adhesive, stitching, stapling, crosslinking, or other such techniques known in the field. Other edges, e.g., edges 105 and 106, may not be yet joined together, thereby defining an opening for inserting one or more objects 120. In some embodiments, the at least one sheet of bioscaffold material 114 has a generally rectangular configuration with one end and one or both sides joined together to form a pouch-like structure. As such, the pouch-like structure may generally be rectangular.

Figure 2:
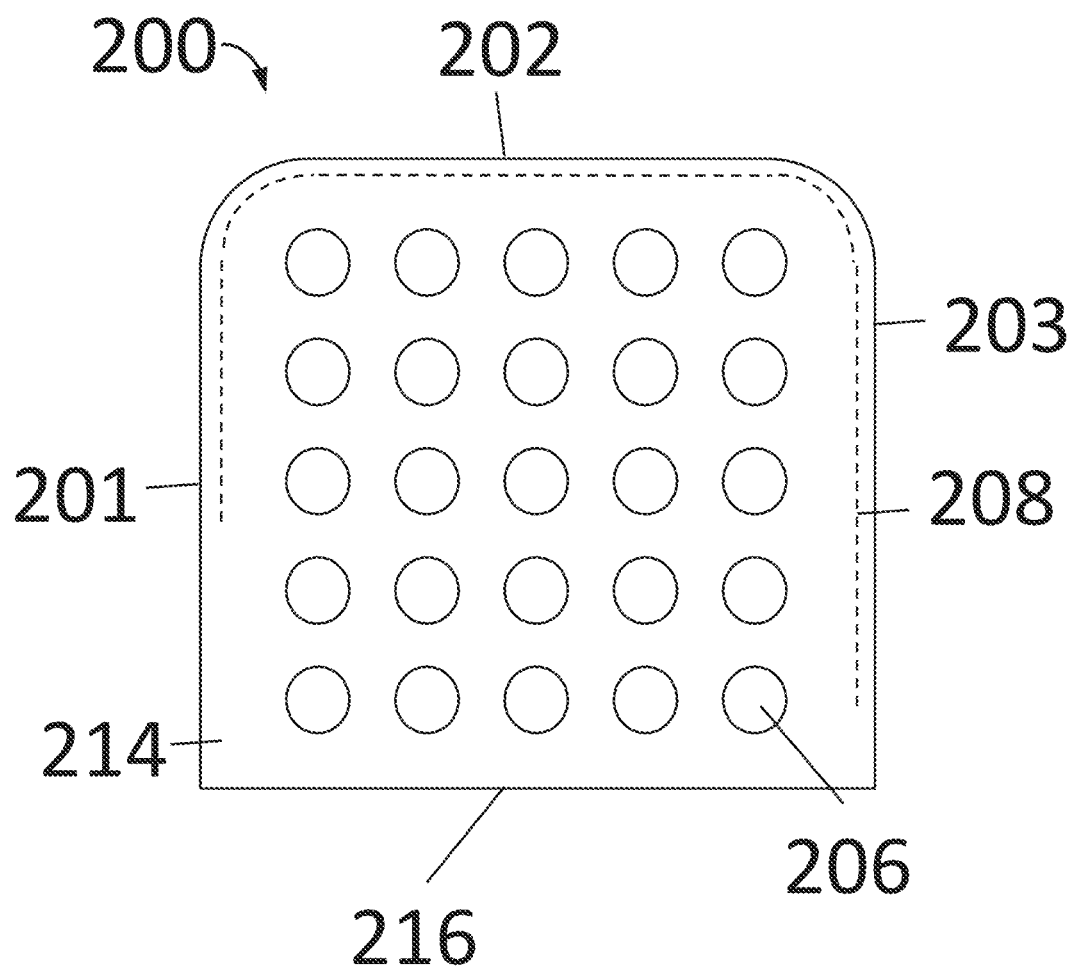
FIG. 2 provides an orthogonal view of one embodiment of encasement structure fabricated from a folded sheet of bioscaffold material, as described herein.

Referring now to FIG. 2, an isometric view of one embodiment of an encasement structure 200 prepared from a folded sheet of bioscaffold material is shown. In FIG. 2, edges 201, 202, and 203 have been joined with stitching 208. The encasement structure 200 has been prepared with a sheet of bioscaffold material that has been folded to create a folded edge 216. The sheet of bioscaffold material 214 is shown as including perforations 206 which are optional and need not be present. Though not visible in the view depicted in FIG. 2, one or more objects have been placed inside the encasement structure 200 which may be now ready for implantation. While the encasement structure 200 is shown as generally rectangular shaped, different embodiments of the encasement structure can be of any size and/or shape, such as oblong, circular, square, or any irregular shape.

For example, an encasement structure may be, it its longest dimension, up to about 50 cm, up to about 40 cm, up to about 30 cm, or up to about 20 cm. For example, in any embodiment, an encasement structure may have a longest dimension that is about 2 cm to about 50 cm, about 2 cm to about 40 cm, about 2 cm to about 30 cm, about 2 cm to about 20 cm, about 2 cm to about 15 cm, about 5 cm to about 11 cm, about 8 cm to about 15 cm, about 5 cm to about 8 cm, or about 6 cm to about 10 cm. In any embodiment, an encasement structure may be sized with a width or diameter that is equal to (e.g., if the encasement structure is square or circular) or less than the longest dimension, such as up to about 50 cm, up to about 40 cm, up to about 30 cm, or up to about 20 cm. For example, in any embodiment, a depot may have a width or diameter that is about 2 cm to about 50 cm, about 2 cm to about 40 cm, about 2 cm to about 30 cm, about 2 cm to about 20 cm, about 2 cm to about 15 cm, about 5 cm to about 11 cm, about 8 cm to about 15 cm, about 5 cm to about 8 cm, or about 6 cm to about 10 cm.

Figure 3:
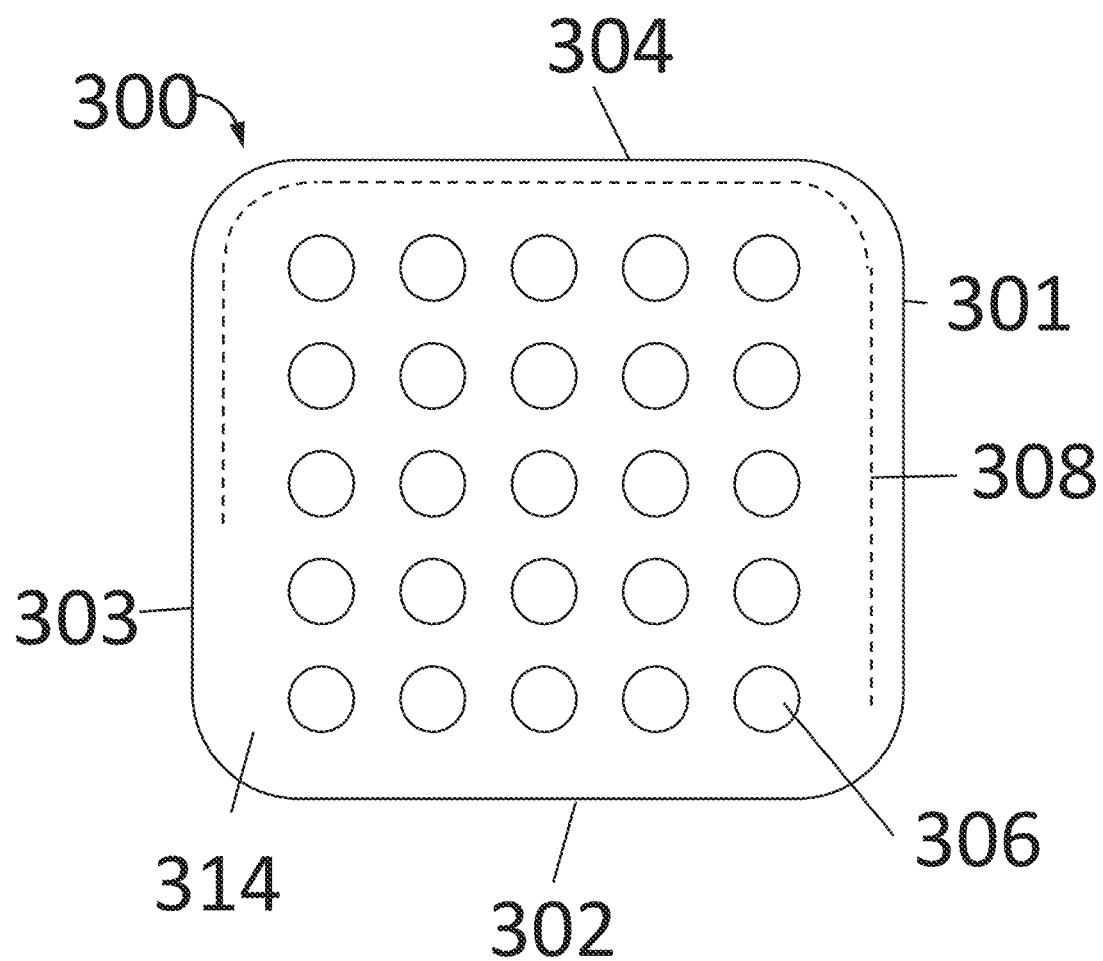
FIG. 3 provides an orthogonal view of one embodiment of encasement structure fabricated from two sheets of bioscaffold material, as described herein.

In another embodiment, an encasement structure comprises at least two sheets of bioscaffold material to form a pouch-like structure, where the at least two sheets of bioscaffold material are arranged substantially congruent one top of one another and joined on one or more edges, thereby forming an internal region and an opening, wherein one or more objects may be inserted. FIG. 3 depicts one such configuration of an encasement structure 300, where edges 301, 303, 304 are joined by stitching 308 and edge 302 has been left open to receive one or more objects into an internal region (not shown) created by the two sheets of bioscaffold material. The sheets of bioscaffold material 314 in FIG. 3, like FIG. 2, depict perforations 306 which are entirely optional.

In embodiments of encasement structures comprising two or more sheets of bioscaffold material, each of the sheets may independently comprise one or more of the same or different bioscaffold materials as one or more of the other sheets and be constructed using the same or different techniques. In any embodiment, a sheet of bioscaffold material, whether used as the only sheet of bioscaffold material in an encasement structure with only one sheet of bioscaffold material or whether used in an encasement structure with two or more sheets of bioscaffold material, may be made from one or more, such as two, three, four, or more laminae of bioscaffold material. That is, two, three, four, five or more thinner layers of bioscaffold material may be combined to form laminae of a sheet of bioscaffold material. Various additional details regarding encasement structures can be found, for example, in U.S. Pat. Nos. 9,066,993, 10,293,084, and 10,159,764, each of which is hereby incorporated by reference herein in its entirety.

Depots

In any embodiment, an encasement structure, as disclosed herein, further comprises one or more depots for delivering one or more active agents to the encased medical device and/or any tissue within or surrounding an encasement structure upon or after implantation in a subject. In one embodiment, an encasement structure can include one or more depots that are integrated with or affixed to the surface of an encasement structure. In another embodiment, an encasement structure can be configured to receive a depot for delivering an active agent.

Figure 4:
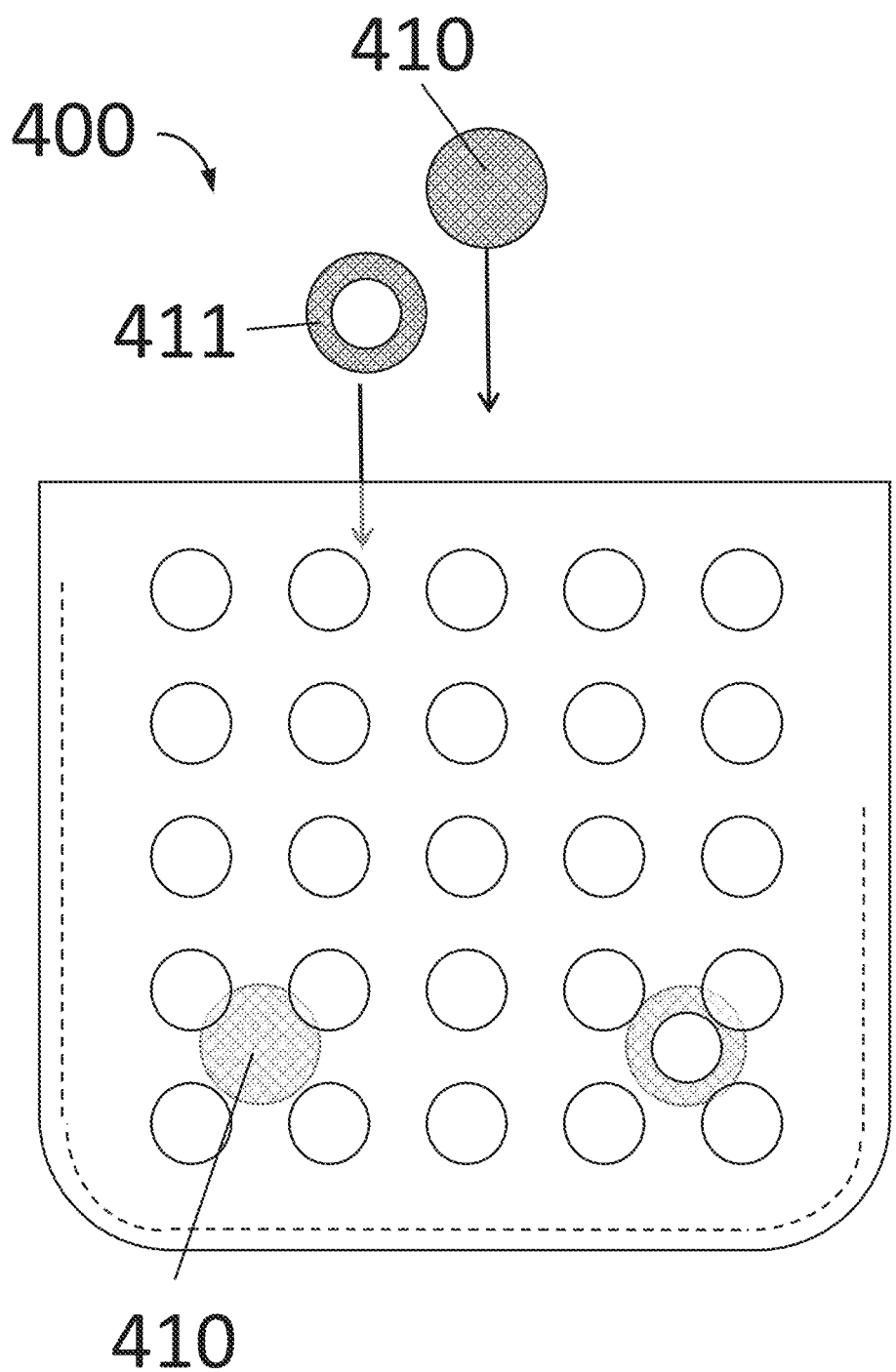
FIG. 4 provides an orthogonal view of several disk-shaped depots and an encasement structure.

In FIG. 4, an encasement structure 400 similar to that as shown in FIG. 2 further includes depots 410, 411 that are attached to or incorporated into the encasement structure 400. The depots 410, 411 may comprise one or more bioabsorbable materials and one or more active ingredients, for example, to aid in implantation of the encasement structure 400 and one or more objects contained within an internal region therein into a subject, such as, but not limited to, an antibiotic (e.g., rifampin, minocycline, gentamicin, vancomycin), an anti-inflammatory agent, an anti-hematoma agent, an anti-scarring agent, or any active agent previously mentioned herein.

Examples of suitable bioabsorbable materials include bioabsorbable polymers and/or a natural materials, which are well-known to a person skilled in the art. Bioresorbable or bioabsorbable polymers that may be used include, but are not limited to, poly(L-lactic acid), polycaprolactone, poly(lactide-co-glycolide), poly(hydroxybutyrate), poly(hydroxybutyrate-co-valerate), polydioxanone, polyorthoester, polyanhydride, poly(glycolic acid), poly(D,L-lactic acid), poly(glycolic acid-co-trimethylene carbonate), polyhydroxyalkanates, polyphosphoester, polyphosphoester urethane, poly(amino acids), cyanoacrylates, poly(trimethylene carbonate), poly(iminocarbonate), copoly(ether-esters) (e.g., PEO/PLA), polyalkylene oxalates, polyphosphazenes, or any combination thereof. For example, in any embodiment, a depot may be made from poly(lactide-co-glycolide) (PLGA) with a ratio of lactic acid to glycolic acid of about 75:25 to about 25:75, or anywhere there between, such as about 50:50. In any embodiment, such a depot may comprise an antibiotic, such as minocycline, rifampin, gentamicin, or vancomycin.

In any embodiment, a depot may comprise or be in the form of a hydrogel. Hydrogels are typically prepared by cross-linking various monomers and/or polymers to provide a three-dimensional polymer network. Non-limiting examples of polymers include polyoxyethylene-polypropylene block copolymers, ionic polysaccharides such as chitosan or sodium alginate, cellulose, and biodegradable polymers such as poly-lactides (PLA) or poly-glycolides (PGA), butylene succinate (PBS), polyhydroxyalkanoate (PHA), polycaprolactone acid lactone (PCL), polyhydroxybutyrate (PHB), glycolic amyl (PHV), PHB and PHV copolymer (PHBV), and poly lactic acid (PLA)-polyethylene glycol (PEG) copolymers (PLEG).

A depot, as disclosed herein, comprises one or more active agents selected from an antibiotic, antifungal agent, anti-viral agent, anti-pain agent, anesthetic, analgesic, steroidal anti-inflammatory, non-steroidal anti-inflammatory, anti-neoplastic, anti-spasmodic, hormone, enzyme, enzyme inhibitor, anticoagulant, antithrombic agent, polypeptide, oligonucleotide, polynucleotide, nucleoprotein, compound modulating cell migration, compound modulating proliferation and/or growth of tissue, vasodilating agent, anti-hematoma agent, anti-scarring agent, and any combination thereof.

Non-limiting examples of suitable active agents include atropine, tropicamide, dexamethasone, dexamethasone phosphate, betamethasone, betamethasone phosphate, prednisolone, triamcinolone, triamcinolone acetonide, fluocinolone acetonide, anecortave acetate, budesonide, cyclosporine, FK-506, rapamycin, ruboxistaurin, midostaurin, flurbiprofen, suprofen, ketoprofen, diclofenac, ketorolac, nepafenac, lidocaine, neomycin, polymyxin B, bacitracin, gramicidin, gentamicin, oxytetracycline, ciprofloxacin, ofloxacin, tobramycin, amikacin, vancomycin, cefazolin, ticarcillin, chloramphenicol, miconazole, itraconazole, trifluridine, vidarabine, ganciclovir, acyclovir, cidofovir, foscarnet, idoxuridine, adefovir dipivoxil, methotrexate, carboplatin, phenylephrine, epinephrine, dipivefrin, timolol, 6-hydroxydopamine, betaxolol, pilocarpine, carbachol, physostigmine, demecarium, dorzolamide, brinzolamide, latanoprost, insulin, verteporfin, pegaptanib, ranibizumab, and other antibodies, antineoplastics, caspase-1 inhibitors, caspase-3 inhibitors, α-adrenoceptors agonists, NMDA antagonists, and any combination thereof.

In any embodiment, one or more of the depots may include one or more antiarrhythmic agents. Examples of suitable antiarrhythmic agents (of which one or more may be included in a depot) include Class I-Class V antiarrhythmic agents, such as quinidine, procainamide, disopyramide (Class Ia), lidocaine, phenytoin, mexiletine (Class Ib), flecainide, propafenone, moricizine (Class Ic), propranolol, esmolol, timolol, metoprolol, atenolol (Class II), amiodarone, sotalol, ibutilide, dofetilide (Class III), verapamil and diltiazem (Class IV), adenosine, and digoxin (Class V).

In any embodiment, one or more of the depots may include one or more antibiotics. Examples of suitable antibiotics (of which one or more may be included in a depot) include aminoglycosides, cephalosporins, chloramphenicol, clindamycin, erythromycins, fluoroquinolones, macrolides, azolides, metronidazole, penicillins, tetracyclines, trimethoprim-sulfamethoxazole, vancomycin, rifampin, gentamicin, and minocycline.

In any embodiment, one or more of the depots may include one or more steroids. Examples of suitable steroids (of which one or more may be included in a depot) include andranes (e.g., testosterone), cholestanes, cholic acids, corticosteroids (e.g., dexamethasone), estraenes (e.g., estradiol), and pregnanes (e.g., progesterone).

In any embodiment, one or more of the depots may include one or more narcotic analgesics. Examples of suitable narcotic analgesics (of which one or more may be included in a depot) include morphine, codeine, heroin, hydromorphone, levorphanol, meperidine, methadone, oxycodone, propoxyphene, fentanyl, methadone, naloxone, buprenorphine, butorphanol, nalbuphine, and pentazocine.

In any embodiment, one or more of the depots may include one or more chemotherapy agents. Examples of suitable chemotherapy agents (of which one or more may be included in a depot) include antimetabolites (e.g., such as purine analogues, pyrimidine analogues), antifolates, plant alkaloids (e.g., vincristine, vinblastine, vinorelbine, vindesine, podophyllotoxin, etoposide, and teniposide), taxanes (e.g., paclitaxel and docetaxel), topoisomerase inhibitors (e.g., irinotecan, topotecan, amsacrine, etoposide, etoposide phosphate, and teniposide), cytotoxic antibiotics (e.g., actinomycin, bleomycin, plicamycin, and mitomycin), anthracyclines (e.g., doxorubicin, daunorubicin, valrubicin, idarubicin, epirubicin), and antibody treatments (e.g., abciximab, adalimumab, alemtuzumab, basiliximab, belimumab, bevacizumab, brentuximab vedotin, canakinumab, cetuximab, certolizumab pego, daclizumab, denosumab, eculizumab, efalizumab, gemtuzumab, golimumab, ibritumomab tiuxetan, ipilimumab, muromonab-CD3, natalizumab, ofatumumab, omalizumab, palivizumab, panitumumab, ranibizumab, rituximab, tocilizumab (atlizumab), tositumomab, and trastuzumab).

In any embodiment, one or more of the depots may include one or more anti-inflammatory agents. Examples of suitable anti-inflammatory agents (of which one or more may be included in a depot) include alclofenac, alclometasone dipropionate, algestone acetonide, alpha amylase, amcinafal, amcinafide, amfenac sodium, amiprilose hydrochloride, anakinra, anirolac, anitrazafen, apazone, balsalazide disodium, bendazac, benoxaprofen, benzydamine hydrochloride, bromelains, broperamole, budesonide, carprofen, cicloprofen, cintazone, cliprofen, clobetasol propionate, clobetasone butyrate, clopirac, cloticasone propionate, cormethasone acetate, cortodoxone, decanoate, deflazacort, delatestryl, depo-testosterone, desonide, desoximetasone, dexamethasone dipropionate, diclofenac potassium, diclofenac sodium, diflorasone diacetate, diflumidone sodium, diflunisal, difluprednate, diftalone, dimethyl sulfoxide, drocinonide, endrysone, enlimomab, enolicam sodium, epirizole, etodolac, etofenamate, felbinac, fenamole, fenbufen, fenclofenac, fenclorac, fendosal, fenpipalone, fentiazac, flazalone, fluazacort, flufenamic acid, flumizole, flunisolide acetate, flunixin, flunixin meglumine, fluocortin butyl, fluorometholone acetate, fluquazone, flurbiprofen, fluretofen, fluticasone propionate, furaprofen, furobufen, halcinonide, halobetasol propionate, halopredone acetate, ibufenac, ibuprofen, ibuprofen aluminum, ibuprofen piconol, ilonidap, indomethacin, indomethacin sodium, indoprofen, indoxole, intrazole, isoflupredone acetate, isoxepac, isoxicam, ketoprofen, lofemizole hydrochloride, lomoxicam, loteprednol etabonate, meclofenamate sodium, meclofenamic acid, meclorisone dibutyrate, mefenamic acid, mesalamine, meseclazone, mesterolone, methandrostenolone, methenolone, methenolone acetate, methylprednisolone suleptanate, momiflumate, nabumetone, nandrolone, naproxen, naproxen sodium, naproxol, nimazone, olsalazine sodium, orgotein, orpanoxin, oxandrolane, oxaprozin, oxyphenbutazone, oxymetholone, paranyline hydrochloride, pentosan polysulfate sodium, phenbutazone sodium glycerate, pirfenidone, piroxicam, piroxicam cinnamate, piroxicam olamine, pirprofen, prednazate, prifelone, prodolic acid, proquazone, proxazole, proxazole citrate, rimexolone, romazarit, salcolex, salnacedin, salsalate, sanguinarium chloride, seclazone, sermetacin, stanozolol, sudoxicam, sulindac, suprofen, talmetacin, talniflumate, talosalate, tebufelone, tenidap, tenidap sodium, tenoxicam, tesicam, tesimide, testosterone, testosterone blends, tetrydamine, tiopinac, tixocortol pivalate, tolmetin, tolmetin sodium, triclonide, triflumidate, zidometacin, and zomepirac sodium.

In any embodiment, one or more of the depots may include an active agent selected from one or more of an anti-hematoma agent, an anti-fibrinolytic agent, an anti-hemorrhagic agent, and a hemostatic agent. Non-limiting examples of such agents (of which one or more may be included in a depot) include aprotinin, aminocaproic acid, tranexamic acid, recombinant Factor VII, desmopressin, serpin, chitosan, gelatin, acetylglusamine, ethamsylate, Vitamin K analogs, thrombin, Gelform, fibrinogen, fibronectin, and the like.

In any embodiment, one or more of the depots may include one or more anti-scarring agents. Examples of suitable anti-scarring agents (of which one or more may be included in a depot) include angiogenesis inhibitors, agonists or antagonists for 5-lipoxygenases, chemokine receptor agonists CCR (1, 3 and 5), cell cycle inhibitors, cyclin dependent protein kinase inhibitors, EGFs (epidermal growth factor), receptor kinase inhibitors, elastase inhibitors, Factor Xa inhibitors, farnesyl transferase inhibitors, fibrinogen agonists, guanylate cyclase activators, IL-4 agonists and immunomodulators. For example, the anti-scarring agent may be selected from one or more of acetmetacin, acrivastine, aldosterone, antazoline, astemizole, azatadine, azelastine, beclometasone, betamethasone, bromfenac, buclizine, carprofen, cetirizine, chloropyriline, chloropheniramine, clemastine, cromolyn, cyclizine, cyproheptadine, dexamethasone, diazoline, diclofenac, diphenhydramine, ebastine, emedastine, epinastine, etodolac, fenbufen, fenoprofen, fexofenadine, fludrocortisone, flurbiprofen, fluorometalone, hydroxyzine, ibuprofen, indometacin, ketoprofen, ketorolac tromethamine, ketotifen, levocabastine, levocetirizine, lodoxamide, loratadine, loteprednol, loxoprofen, medrysone, mepivacaine, mequitazine, methdilazine, methapyrilene, monteleukast, nabumetone, naphazoline, naproxen, nedocromil, norastemizole, norebastine, olopatadine, phenidamine, phenylephrine, oxatamide, oxymetazoline, pemirolast, pheniramine, picumast, prednisilone, promethazine, rimexalone, repirinast, sulindac, suprofen, zafirlukast, tetrahydozoline, terfenadine, tiaprofenic acid, tometim, tranilast, triamcinolone, trimeprazine, and triprolidine.

The timeframe in which a depot releases an active agent incorporated therein ("release period") is not particularly limited. For example, in any embodiment, a depot can release one or more active agents over a period of about several hours, about 1 to about 7 days, about several weeks, or about several months, depending on the particular formulation. In any embodiment, an active agent may be released from a depot over a period of about 1 minute to about 5 minutes, about 1 minute to about 10 minutes, about 1 minute to about 30 minutes, about 1 minute to about 60 minutes, about 1 minute to about 3 hours, about 1 minute to about 6 hours, about 1 minute to about 24 hours, about 1 minute to about 2 days, or about 1 minute to about 3 days. Alternatively, an active agent may be released from a depot over a period of about 2 days to about 4 days, about 2 days to about 7 days, about 1 week to about 2 weeks, about 1 week to about 3 weeks, about 1 week to about 1 month, about 1 week to about 2 months, about 1 week to about 3 months, about 1 week to about 4 months, about 1 week to about 5 months, about 1 week to about 6 months, about 1 week to about 9 months, or about 1 week to about 12 months. For example, about 50% of an active agent within the depot may be released over a period of about 1 week to 2 weeks. In another example, about 50% of an active agent may be released over a period of about 1 week to 3 weeks. In yet another example, about 50% of an active agent may be released, for a period of about 1 week to 4 weeks. In yet another example, about 50% of an active agent may be released over a period of about 1 week to 6 weeks. In yet another example, about 50% of an active agent may be released over a period of about 1 week to 8 weeks. In yet another example, about 50% of an active agent may be released over a period of about 1 week to 16 weeks. In yet another example, about 50% of an active agent may be released over a period of about 1 week to 32 weeks. In any embodiment, the release rate may be constant for some or all of the release period. Alternatively, a release rate may not be constant throughout a release period. For example, an active agent may begin to be released from a depot after a lag period after implantation, such as a lag period of about 1 day, about 3 days, about 1 week, about 2 weeks, about 3 weeks, or about 4 weeks. As such, in any embodiment, the release of an active agent from a depot may not be at a constant rate. For example, a depot may release an active agent at an initial fast rate, such as for a period of 1-2 weeks, and thereafter, release the active agent at a slower rate. In yet another example, a depot may release an active agent at an initial slow rate and thereafter, release the active agent at a faster rate. The duration of the release period may be controlled by, inter alia, the composition of the biocompatible polymer matrix, the concentration of one or more active agents, and inclusion of release profile-modifying agents.

An effective therapeutic amount of the one or more active agents, which may be present in one or more depots, may be about 1 mg to about 500 mg, about 1 mg to about 400 mg, about 1 mg to about 300 mg, about 1 mg to about 200 mg, about 1 mg to about 100 mg, about 1 mg to about 50 mg, or about 1 mg to about 20 mg. Specific examples include about 1 mg, about 5 mg, about 10 mg, about 25 mg, about 50 mg, about 75 mg, about 100 mg, about 150 mg, about 200 mg, about 250 mg, about 300 mg, about 350 mg, about 400 mg, about 450 mg, about 500 mg, or any range in between these values. For example, a depot may comprise about 1 mg to about 20 mg of an antibiotic (e.g., rifampin, vancomycin, gentamicin, minocycline), such as about 4 mg to about 10 mg or about 5 mg to about 6 mg. An encasement structure together with one or more depots comprising one or more active agents, as disclosed herein, may provide an effective amount of the one or more active agents through any desired treatment period, for example up to 12 months, up to 10 months, up to 9 months, up to 8 months, up to 7 months, up to 6 months, up to 5 months, up to 4 months, up to 3 months, up to 2 months, or up to 1 month.

Methods by which a depot may be manufactured are not particularly limited and may be according to any method known to one of skill in the art. For example, in any embodiment, a depot can be injection molded, extruded, melt spun or cast, or solvent cast into a desired shape. In a particular example, one or more biodegradable polymers can be dry mixed with one or more curing agents, optionally with a filler such as oxidized starch or cellulose, and fed into an injection molding system where the polymer is molded at high temperature to allow crosslinking. Examples of curing agents include, without limitation, polyanhydrides such as poly(adipic anhydride) and poly(sebacic anhydride). The fabricated depots may be further cured by annealing in a hot oven.

Methods by which the one or more active agents are incorporated into a depot are likewise not particularly limited and may be accomplished by any suitable method known to one of skill in the art, including, for example, surface treatment (e.g., spraying, dip coating), impregnation (e.g., soaking) of an already-formed depot, a combination thereof, or, in some cases, mixing one or more active agents into a depot-forming material during a manufacturing step, which can thereafter be hardened by drying, curing, cross-linking, polymerization, or by other known methods. For example, one or more active agents can be added to a polymer matrix, e.g., a biodegradable polymer matrix, during the manufacturing process of a depot.

Figure 5:
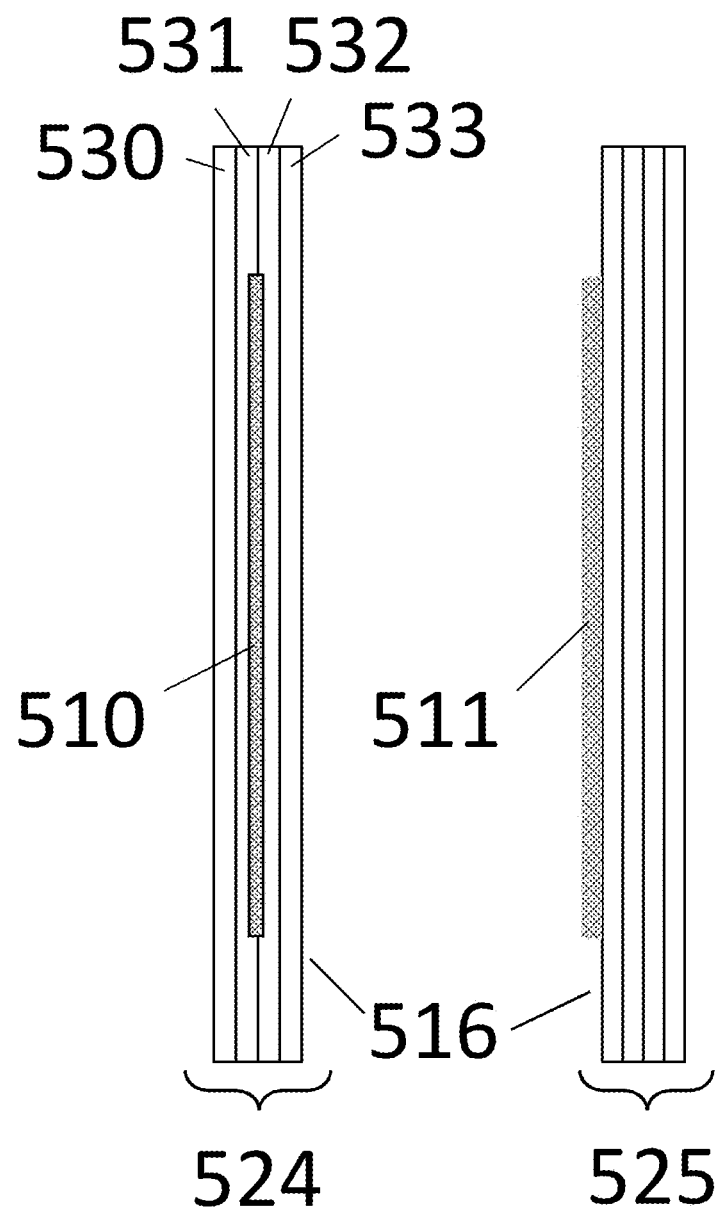
FIG. 5 depicts two orthogonal side views of sheets of bioscaffold material, wherein a depot may be attached on the surface of a sheet (right) or between (left) lamina of a sheet.

The shape of a depot is likewise not particularly limited. FIG. 4 depicts ring-shaped depots 411 and disc-shaped depots 410, however, in any embodiment, a depot can be fabricated into any shape, such as circular, ovoid, polygonal, oblong, triangular, rectangular, square, irregular, uniform, non-uniform, variable and/or tapered rod, microsphere, thin film, wrap, foam, tablet, suture (e.g., a filament), ring, or adhesive. In one example, a depot may be generally disk-shaped members with a circular cross-sectional shape. In another example, a depot may have an hour-glass shape and be configured to wrap around an encasement structure or medical device. In yet another example, a depot may be chemically or mechanically attached to a surface of an encasement structure by utilizing a variety of different techniques, including suturing one or more depots to an encasement structure, attaching one or more depots to an encasement structure by a biodegradable adhesive, immobilizing one or more depots between sheets or laminae of the bioscaffold material of the encasement structure (e.g., between laminae of ECM), or by drying a one or more hydrogel depots on one or more surfaces of an encasement structure. In any embodiment, one or more depots may be attached to one or more surfaces of an encasement structure or inserted within one or more cavities of an encasement structure, such as one formed between lamina of a multi-laminate bioscaffold material. In another example, an encasement structure may comprise a pocket-like structure, fabricated from the same or different material as the bioscaffold material of the one or more sheets of the encasement structure, for receiving one or more of depots. A pocket-like structure may be present on a surface of an encasement structure or present within an internal region of an encasement structure. A depiction of these various embodiments is shown in FIG. 5, where each sheet of bioscaffold material 516 is comprised of four laminae 530, 531, 532, 533. In the sheet on the left 524 in FIG. 5, a depot 510 is inserted between lamina 531 and 532. In the sheet on the right 525, a depot 511 is attached to the surface of the sheet.

The size of a depot is not particularly limited, and in any embodiment, for example, may be (in its longest dimension) up to about 50 mm, such as up to about 40 mm (e.g., about 5 mm or 10 mm to about 40 mm), up to about 30 mm (e.g., about 5 mm or 10 mm to about 30 mm), up to about 25 mm (e.g., about 5 mm or 10 mm to about 25 mm), up to about 20 mm (e.g., about 5 mm or 10 mm to about 20 mm), up to about 15 mm (e e.g., about 5 mm or 10 mm to about 15 mm), or up to about 10 mm (e.g., about 5 mm to about 10 mm). In any embodiment, a depot may be, for example, a ring depot with an outer diameter of about 20 mm to about 30 mm and an inner diameter of about 10 mm to about 20 mm. As yet another example, a depot maybe be fabricated in a shape and size according to the shape and size of the medical device and the shape of the internal region of an encasement structure so that one or more of the depots can occupy the internal region with the medical device. In embodiments where an encasement structure comprises more than one depot, each depot may be the same or substantially the same shape and/or size or may be a different shape and/or size.

A depot may be provided with an encasement structure in a number of configurations, for example, one or more depots may be packaged separately from one or more encasement structures for attachment to an encasement structure at the time of implant. The number of depots that are attached to the encasement structure may depend on the need and requirement of the procedure, such as for delivering an effective amount of the active agent, the duration of the release of the active agent, patient risk profile, and the like. In another example, an encasement structure may be provided with one or more depots pre-attached thereto.

In any embodiment, a surgical procedure for which an encasement structure as described herein may be used may comprise implantation of pacing devices, defibrillators, implantable access systems, monitors, stimulators including neurostimulators, ventricular assist devices, pain pumps, infusion pumps and other implantable objects in a subject.

The number of depots to be used may be determined according to a determined therapeutically effective amount of the active ingredient. For example, the number of the depots that may be attached or otherwise applied to each encasement structure may be 1 to 50 depots, 1 to 40 depots, 1 to 30, 1 to 20 depots, 1 to 10 depots, 1 to 8 depots, 1 to 5 depots, or 1 to 3 depots. In any embodiment, a single depot may be attached or otherwise applied to an encasement structure. Alternatively, in any embodiment, one or more depots may be placed in close proximity to an encasement structure that is implanted in a subject but may themselves not be in direct contact with an encasement structure.

The total effective therapeutic amount of the active agent delivered by the methods disclosed herein may be about 1 mg to about 5000 mg, about 1 mg to about 4000 mg, about 1 mg to about 3000 mg, about 1 mg to about 2000 mg, about 1 mg to about 1000 mg, about 1 mg to about 500 mg, about 1 mg to about 200 mg, about 10 mg to about 300 mg, for example, about 10 mg to about 100 mg, about 50 mg to about 150 mg, about 75 mg to about 200 mg, about 100 mg to about 250 mg, about 150 mg to about 300 mg, or about 25 mg, about 50 mg, about 75 mg, about 100 mg, about 125 mg, about 150 mg, about 175 mg, about 200 mg, about 225 mg, about 250 mg, about 275 mg, or any range or any value there between.

The methods disclosed herein provide the option to administer the one or more active agents when needed. For example, a desired number of depots delivering a desired amount of one or more active agents may be first attached to the encasement structure and implanted into the subject. After a period of time, the encasement structure may be removed and additional depots may be attached to the encasement structure and again implanted in the subject.

In other embodiments, the methods disclosed herein allow delivery of different therapeutic amounts of one or more active agents to two or more patients with differing therapeutic needs. For example, a number of depots, pre-determined based on patient's risk profile and characteristics, can be attached to an encasement structure for implantation into that patient. A patient requiring more active agent for therapeutic effect may be implanted with an encasement structure with a greater number of depots as compared to an encasement structure used in a patient requiring a lesser amount of active agent for therapeutic effect.

In additional embodiments, the methods disclosed herein have the ability to control the active agent release profile. For example, depots that have varying active agent release profiles, such as depots releasing active agents rapidly within one week or depots with extended release up to several months, may be attached to or otherwise associated with an encasement structure, as described herein. In any embodiment, an encasement structure may include a plurality of depots, where one or more exhibit a different release profile than one or more others. Examples of suitable release profiles include, but are not limited to, short release period, extended release periods, or a release profile with a lag period. Depending on the requirement and patient's characteristics, a physician can alter a release profile of a depot. These structures and methods disclosed herein offer better control in delivering an active agent compared to conventional encasement structures that are coated with one or more active agents.

In some embodiments, the depots are not limited to use in association with encasement structures. The depots disclosed herein can also be used in direct association with an implantable medical device without the use of encasement structures. In other embodiments, the depots disclosed herein can also be used in association with other bioscaffold materials, such as with tissue grafts, engineered tissue scaffolds, biological dressings, patch grafts, a tissue pockets, and the like.

Each depot may be configured to release one or more active agents immediately or, more preferably, over an extended period of time, which may be accomplished using bioabsorbable or disintegrating materials to construct the depot. For example, a depot can be constructed from a bioabsorbable material or a combination of two or more bioabsorbable materials, including metal-based bioabsorbable materials and polymer-based bioabsorbable materials. A depot may be constructed from a hydrogel, such as a polymer hydrogel (e.g., polymers of one or more of polyacrylic acid, polyvinylpyrrolidone, polyvinyl alcohol, polyethylene glycol (PEG), poly (L-lactide (PLLA), poly(lactic-co-glycolic acid (PLGA), polyanhydride, poly(aldehyde guluronate), or related copolymers) or a natural biomaterial hydrogel (e.g., collagen, chitosan, hyaluronan/hyaluronic acid, chondroitin sulfate, alginate, agar/agarose, fibrin, polypeptide, or polysaccharide hydrogel). The bioabsorbable material can be selected to provide a depot with the desired time-release characteristics for the active agent incorporated therein. For example, a suitable bioabsorbable material for constructing a depot may be selected to be absorbed by the subject's body over a desired time period. A depot may be configured to release an active agent over a time frame of one hour to multiple hours (such as 2, 3, 10, 15, or 24 hours), one day to multiple (such as 2, 4, 6, or 7 days, multiple weeks (such as 1 week to 1 month), or multiple months (such as 1 month to 3 months or more), depending on the particular type of bioabsorbable material/s used to fabricate the depot. In one embodiment, a depot can be configured to release an active agent over a time period of at least 7 days. In another embodiment, a depot can be configured to release an active agent such that the local concentration of the active agent released therefrom is sustained at a level above an effective concentration for particular active agent (e.g., the minimum inhibitory concentration for an antibiotic).

A depot may be constructed using a variety of different fabrication techniques suitable for bioabsorbable materials, including solvent casting, melt casting, melt extrusion, in situ polymerization, and/or crosslinking. In embodiments where encasement structure and depots are not provided separately, depots may be chemically or mechanically attached to one or more sheets of bioscaffold material of an encasement structure utilizing a variety of different techniques, including one or more of suturing, attaching by an adhesive, immobilizing between lamina of a sheet of bioscaffold material, and drying a depot to a surface of an encasement structure.

Figure 6:
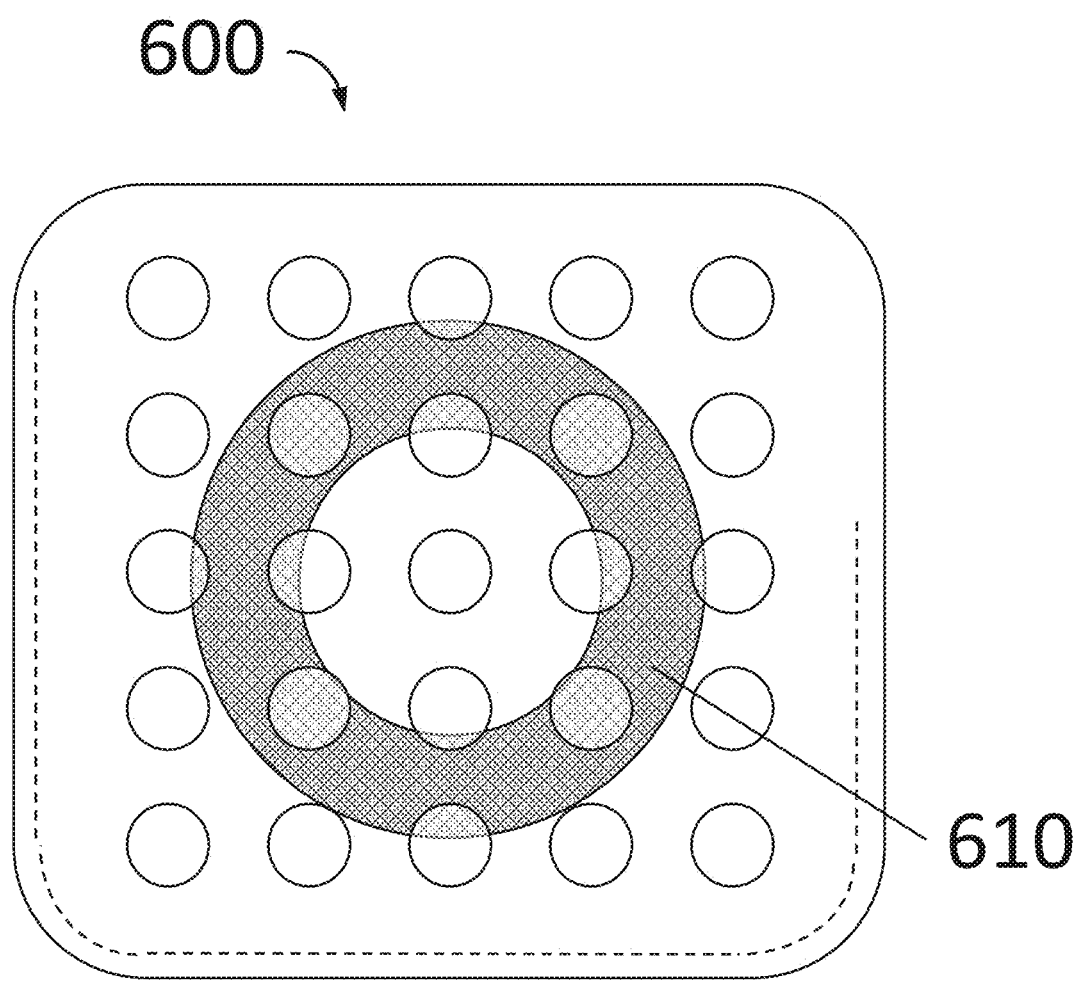
FIG. 6 provides an orthogonal view of a disk-shaped depot and an encasement structure.

FIG. 5 depicted an encasement structure 500 with multiple depots 510, however, in any embodiment, an encasement structure may be provided or otherwise be manufactured and sized to accept one depot, such as a larger one as depicted in FIG. 6, where a large depot 610 is associated with the encasement structure 600.

Figure 7:
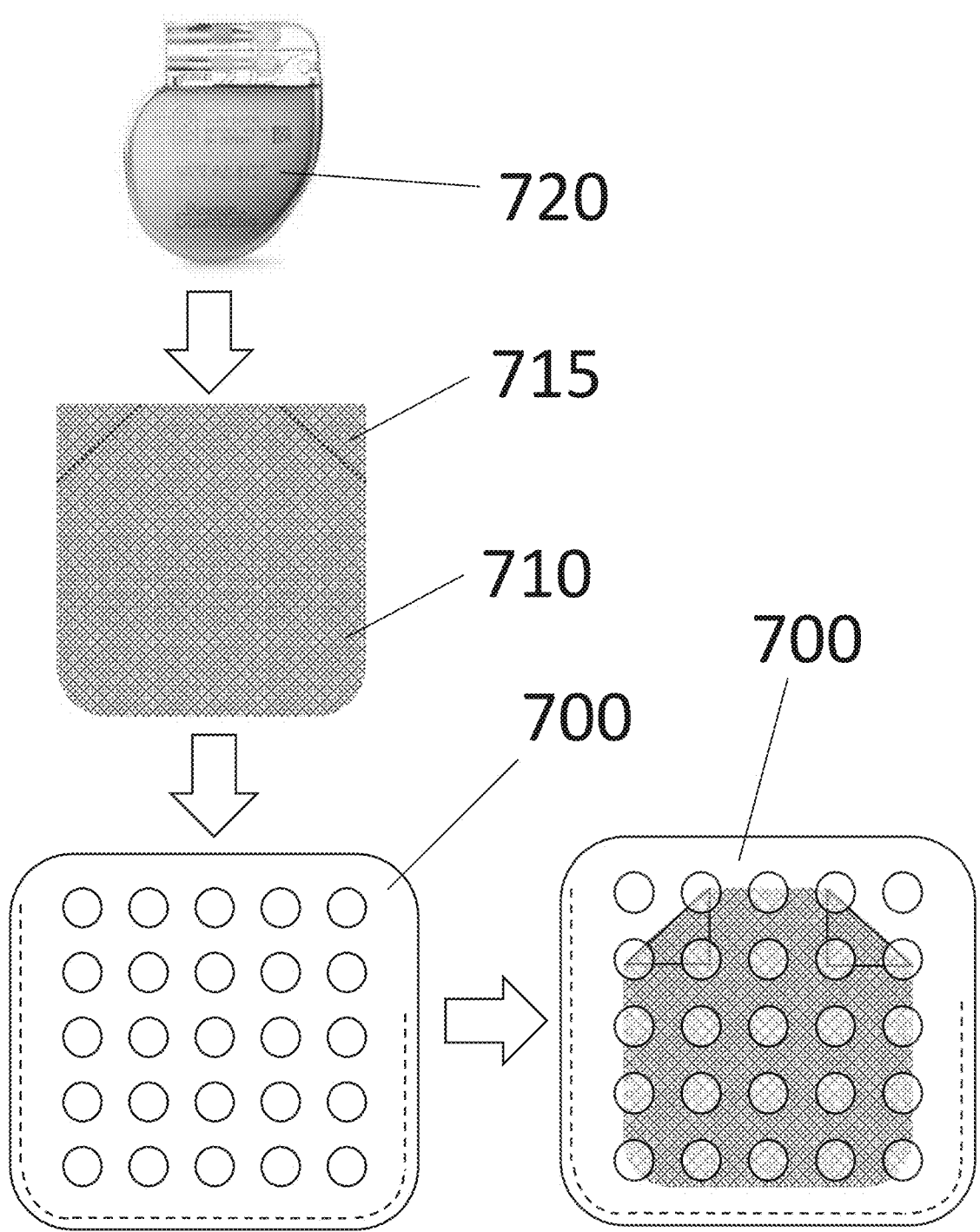
FIG. 7 provides an exploded orthogonal view of a medical device inserted into one embodiment of a depot, which are then collectively inserted into an encasement structure as described herein.
Figure 8:
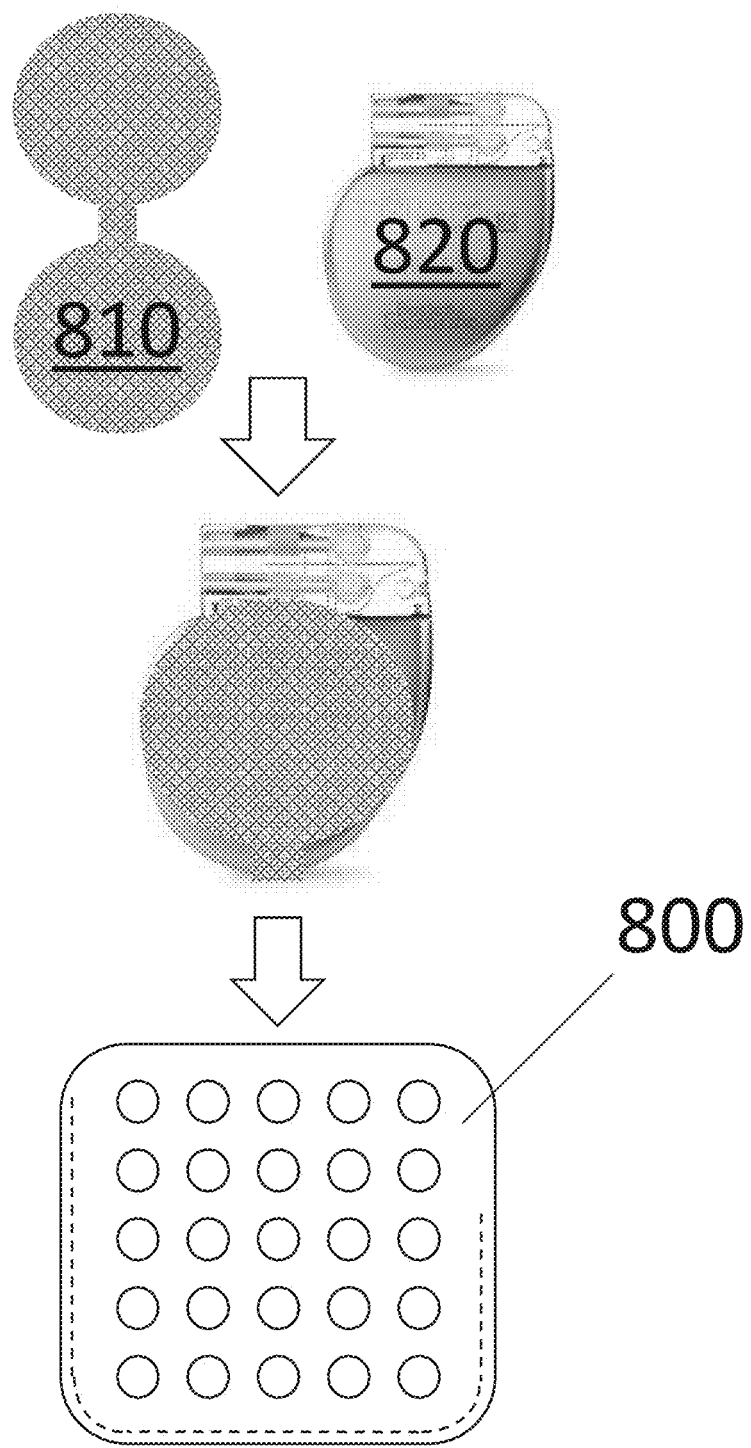
FIG. 8 provides an orthogonal view of another embodiment of a depot which is provided in the form of a wrap that may be secured around a medical device and, collectively, inserted into an encasement structure as described herein.

In another embodiment, a depot may be in the form of a pouch or pocket which may itself be sized and configured to receive one or more objects, such as medical devices, before being inserted into an encasement structure. FIG. 7 provides one such example where medical device 720 is inserted into a pouch-like depot 710, which may be secured shut, for example, by folding down flaps 715, before being inserted into an encasement structure which may have any properties or characteristics as described herein. FIG. 8 depicts a similar embodiment, wherein the depot 810 is in the form of a wrap which may be wrapped around a medical device 820 and inserted into an encasement structure 800.

A depot, in any embodiment, may be a discrete structure where one or more active agents, as described above (e.g., antibiotic, anti-inflammatory, anti-hematoma agent, anti-scarring agent) do not directly contact the at least one sheet of bioscaffold material during storage, therefore preventing interaction of the active agent with (and possible degradation of) the sheet of bioscaffold material. A depot, provided in this manner, may therefore improve a shelf life of an encasement structure when compared to an encasement device that have an active agent coated or otherwise applied directly to the structure of the encasement device. Further, providing a depot separately from the sheet of bioscaffold material of the encasement structure (with the ability to mechanically affixing the one or more depots to the sheet of bioscaffold material during implantation) decreases manufacturing costs by avoiding the use of complex and costly coating or other application techniques to associate the active agent with the bioscaffold material in a suitable and stable manner. Still further, providing a depot separately from an encasement structure permits a variety of different active agent-delivery profiles to be simply and conveniently fabricated by an end user (e.g., implantation surgeon) by simply customizing the number, type, and arrangement of the one or more depots that are affixed to or associated with the sheet of bioscaffold material of the encasement structure at the time of implantation. As such, in another aspect the present disclosure provides a kit comprising one or more encasement structures, each encasement structure comprising at least one sheet comprising a bioscaffold material, the at least one sheet configured and/or arranged to define an internal region that is sized and shaped to hold an implantable medical device therein; and one or more depots comprising one or more active agents and a bioabsorbable material, wherein the one or more depots are configured to release the one or more active agents over a period of time; wherein the encasement structure is configured to receive, and associate securely therewith, the one or more depots. The encasement structure may further have any attributes as described supra; for example, it may comprise a multi-laminate bioscaffold material obtained from one or more of small intestine submucosa (SIS); urinary bladder submucosa (UBS); stomach submucosa (SS); central nervous system tissue; other tissue of mesodermal origin (e.g., mesothelial tissue); dermal tissue; subcutaneous tissue; gastrointestinal tissue (e.g., of the large or small intestine tissue); tissue surrounding growing bone; placental tissue; omentum tissue; cardiac tissue (e.g., pericardium and/or myocardium tissue); kidney tissue; pancreatic tissue; and lung tissue.

In any embodiment, a kit may include one or more encasement structures packaged separately from one or more depots along with instructions guiding a surgeon or physician otherwise assisting with a surgical procedure to attach, insert, or otherwise securely associate one or more depots with or into an encasement structure before implantation. Providing an encasement structure and one or more depots in separate packages may increase shelf life of an encasement structure, which may be, for example, about 1 year, about 2 years, about 3 years, about 4 years, about 5 years, about 6 years, or about 7 years.

As noted above, each depot may independently comprise one or more active agents, such as one or more antibiotics (e.g., rifampin, minocycline, gentamicin, vancomycin), each incorporated into the depot in any therapeutically effective dose, such as about 2 mg to about 20 mg or about 4 mg to about 10 mg. Each depot may contain the same or a different active agent, optionally each with a varying dose. For example, two or more depots, each with a different active agent from at least one other depot, may be used. In another example, two or more depots, each with the same active agent but different doses, may be used.

The one or more depots may comprise one or more bioresorbable materials such as a polymer or hydrogel. poly(L-lactic acid), polycaprolactone, poly(lactide-co-glycolide), poly(hydroxybutyrate), poly(hydroxybutyrate-co-valerate), polydioxanone, polyorthoester, polyanhydride, poly(glycolic acid), poly(D,L-lactic acid), poly(glycolic acid-co-trimethylene carbonate), polyhydroxyalkanates, polyphosphoester, polyphosphoester urethane, poly(amino acids), cyanoacrylates, poly(trimethylene carbonate), poly (iminocarbonate), copoly(ether-esters) (e.g., PEO/PLA), polyalkylene oxalates, polyphosphazenes, or any combination thereof. For example, in any embodiment, a depot may be made from poly(lactide-co-glycolide)(PLGA) with a ratio of lactic acid to glycolic acid of about 75:25 to about 25:75, or anywhere there between, such as about 50:50.

A surgeon may apply or affix the selected depot(s) to an encasement structure (e.g., by inserting the depot(s) into the encasement structure or between laminae of an encasement structure), insert a medical device into an internal region of the encasement structure, and then implant the encasement structure with medical device and depot(s) into a patient, as dictated by a surgical procedure.

The encasement structures disclosed herein, for use with one or more depots, as disclosed herein, are designed and in any embodiment may provide therapeutic benefit to a subject undergoing or who has undergone implantation of a medical device. In particular, implantation of a medical device has many risks and adverse effects associated therewith, including but not limited to, bruising, pain, swelling, redness, inflammation, infection, and hematoma which may be mediated, reduced, or eliminated by using a disclosed encasement structure and depots, as described herein, to encase the medical device before implantation. The bioscaffold material of the encasement structure together with the one or more active agents released from the depot create an environment of modulated healing, such as epithelial growth, fibrin deposition, platelet activation and attachment, inhibition, proliferation and/or differentiation, connective fibrous tissue production and function, angiogenesis, adjacent to the implanted device. For example, the encasement structure comprising at least one sheet of bioscaffold material and one or more depots, as disclosed herein, may alter, delay, retard, reduce, and/or detain one or more of phases associated with healing of damaged tissue, including, but not limited to, the inflammatory phase (e.g., platelet or fibrin deposition) and the proliferative phase. In any embodiment, an encasement structure comprising at least one sheet of bioscaffold material and one or more depots, as disclosed herein, may effectively induce host tissue proliferation, bioremodeling, including neovascularization, e.g., vasculogenesis, angiogenesis, and intussusception, and regeneration of tissue structures with site-specific structural and functional properties. In any embodiment, an encasement structure comprising at least one sheet of bioscaffold material and one or more depots, as disclosed herein, delay or reduce fibrin deposition and platelet attachment to a blood contact surface following tissue damage.

Therefore, in yet another aspect, the present disclosure provides a method of reducing a risk of one or more adverse effects associated with implanting a medical device in a subject in need thereof, the method comprising: inserting the medical device into an encasement structure, the encasement structure comprising: at least one sheet comprising a bioscaffold material, the at least one sheet configured and/or arranged to define an internal region that is sized and shaped to hold the medical device therein; applying one or more depots to the encasement structure to form an encased medical device; and implanting the encased medical device into the subject. In any embodiment, the adverse effects may be one or more of infection (bacterial, viral, or fungal), pain, swelling, inflammation, hematoma, scarring, and vasoconstriction.

For example, a physician can determine characteristics of the patient and/or surgical procedure that is receiving the implantable medical device, such as the type of medical device being implanted, the recovery profile associated with surgical procedures to implant the medical device type, the patient's age, the patient's health profile, and so on. Further, a physician can identify one or more active agents that would provide therapeutic benefit to the patient upon implantation of the encasement structure and the medical device along with effective dosing thereof. Armed with this information, a physician can select one or more depots that are configured to individually or collectively provide the identified active agents in effective amounts to the patient.

The encasement structure may have any of the aforementioned attributes and characteristics as described supra. The one or more depots may likewise have any of the aforementioned attributes and characteristics as described supra. For example, in any embodiment, the encasement structure may be a pouch-like structure and comprise one or more sheets of bioscaffold material which itself may be comprised of one or more laminae. A depot may comprise any active agent, such as one or more antibiotics (e.g., rifampin, minocycline, gentamicin, vancomycin) in any therapeutically effective amount, such as from about 2 mg to about 20 mg or about 2 mg to about 10 mg. The depot may comprise a bioresorbable polymer or a hydrogel, such as any aforementioned polymer (e.g., PLGA). An encasement structure may be configured to receive and secure 1, 2, 3, 4, or more depots, for example, between laminae of a multi-laminate bioscaffold material.

Examples illustrating particular implementations of the various embodiments described above are discussed below.

EXAMPLES

Example 1

A depot can be formed by dissolving a bioabsorbable polymer (e.g., poly(lactide-co-glycolic acid, PLGA, with a ratio of 50:50 PL:GA) in acetone or another suitable solvent (e.g., methanol, chloroform, dichloromethane, dimethylformamide, DMSO, hexafluoroisopropanol, tetrahydrofuran, or any mixture thereof). Rifampin, minocycline, vancomycin, gentamicin, another antibiotic, or a combination thereof may then be added to the polymer solution, either in dissolved or suspension form. A controlled volume of the solution can then be placed in a mold or cast and the depot formed by drying the material within the cast or mold, such as by air drying the depot at room temperature, elevated temperature, or in a vacuum oven. The depot can then be co-packaged with one or more encasement structures or attached to an encasement structure, as described above.

Example 2

A depot can be formed by dissolving or suspending rifampin, minocycline, vancomycin, gentamicin, another antibiotic, or a combination thereof in a hydrogel solution. The hydrogel can include a polymer hydrogel (e.g., polyvinyl alcohol or related copolymers) or a natural biomaterial hydrogel (e.g., collagen, chitosan, hyaluronan, polypeptide, or polysaccharide hydrogel). A controlled volume of hydrogel solution can then be placed in a mold or cast and cured and/or cross-linked within the mold or cast. The resulting hydrogel depot can be packaged directly or further dehydrated (e.g., by air drying at room temperature, at an elevated temperature, or in a vacuum oven) to form the depot, which may be a film. The depot can then be co-packaged with one or more encasement structures or attached to an encasement structure, as described above.

Alternatively, a depot may be formed from a hydrogel material by first preparing a hydrogel solution and curing the solution prior to adding any active agents thereto. The hydrogel may then be placed in and allowed to swell in a water-solution or suspension of rifampin, minocycline, gentamicin, vancomycin, another antibiotic, or a combination thereof to load the active agent into the hydrogel. The resulting hydrogel depot can be packaged directly or further dehydrated (e.g., by air drying at room temperature, at an elevated temperature, or in a vacuum oven) to form the depot, which may be a film. The depot can then be co-packaged with one or more encasement structures or attached to an encasement structure, as described above.

Example 3

Table 1 below provides several useful assemblies of encasement structures with two or more depots. Each disc is constructed from a bioabsorbable polymer (copolymer poly-DL-Lactide-Co-Glycolide (PLGA 50:50)) and is ring-shaped. Each drug-eluting disc contains 5.5 mg of rifampin and 5.5 mg of minocycline and are immobilized in a multi-laminate SIS sheet using PDS sutures. Each side of the encasement structure comprises of two (2-layer) SIS sheets (resulting in a 4-ply sheet) and two or four depots immobilized in the middle, as shown in FIG. 5 (left). The bioabsorbable polymer permits the controlled release of the rifampin and minocycline after implantation.

TABLE 1

| Envelope Size | Height (cm) | Width (cm) | # of discs | rifampin label claim (mg) | minocycline label claim (mg) | nominal rifampin/cm$^2$ (μg/cm$^2$) | nominal minocycline/cm$^2$ (μg/cm$^2$) |
|---|---|---|---|---|---|---|---|
| Small | 5.0 | 5.4 | 2 | 11 | 11 | 204 | 204 |
| Medium | 6.5 | 6.9 | 2 | 11 | 11 | 123 | 123 |
| Large | 8.0 | 6.9 | 2 | 11 | 11 | 100 | 100 |
| X-Large | 9.5 | 6.9 | 4 | 22 | 22 | 168 | 168 |
| XX-Large | 10.8 | 8.9 | 4 | 22 | 22 | 114 | 114 |

It is understood that, although the present invention is described and illustrated in connection with a medical device contained within an encasement structure that may further incorporate one or more depots, the invention is not limited to encased medical devices, but any of the encasement structures disclosed herein along with any of the depots disclosed herein may be employed to encase other devices, including, by way of example, a tracking device.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An encasement structure comprising:
    at least one sheet comprising a bioscaffold material, the at least one sheet configured to define an internal region that is sized and shaped to hold an implantable medical device therein;
    one or more ring-shaped depots associated with the at least one sheet, and
    one or more pockets positioned on a surface of the encasement structure or within an internal region of the encasement structure configured to receive and secure the one or more ring-shaped depots,
    wherein the one or more ring-shaped depots comprise an effective therapeutic amount of one or more active agents and a bioabsorbable material, and are configured to release the one or more active agents over a period of time.

2. The encasement structure of claim 1, wherein the bioscaffold material comprises decellularized extracellular matrix (ECM).

3. The encasement structure of claim 2, wherein the decellularized extracellular matrix is acellular.

4. The encasement structure according to claim 2, wherein the ECM is derived from mammalian tissue.

5. The encasement structure according to claim 2, wherein the ECM is derived from one or more of small intestine submucosa (SIS); urinary bladder submucosa (UBS); stomach submucosa (SS); central nervous system tissue; other tissue of mesodermal origin; dermal tissue; subcutaneous tissue; gastrointestinal tissue; tissue surrounding growing bone; placental tissue; omentum tissue; cardiac tissue; kidney tissue; pancreatic tissue; lung tissue; and any combination thereof.

6. The encasement structure according to claim 1, wherein the bioscaffold material comprises small intestine submucosa.

7. The encasement structure according to claim 1, wherein the one or more ring-shaped depots comprises one or more of a bioabsorbable polymer or a hydrogel.

8. The encasement structure according to claim 1, wherein the one or more ring-shaped depots comprises a copolymer of lactic acid and glycolic acid.

9. The encasement structure according to claim 1, wherein the period of time is about 1 week to about 3 months.

10. The encasement structure according to claim 1, wherein the at least one sheet comprises two or more laminae of the bioscaffold material.

11. The encasement structure according to claim 1, wherein the at least one sheet comprises four laminae of the bioscaffold material.

12. The encasement structure according to claim 1, wherein the at least one sheet comprises two laminae of the bioscaffold material, and wherein the encasement structure is configured to receive and secure the one or more ring-shaped depots between the two laminae of the bioscaffold material.

13. The encasement structure according to claim 1, wherein the one or more active agents are selected from the group consisting of antibiotics, antifungal agents, anti-viral agents, anti-pain agents, anesthetics, analgesics, steroidal anti-inflammatories, non-steroidal anti-inflammatories, antineoplastics, anti-spasmodics, hormones, enzymes, enzyme inhibitors, anticoagulants, antithrombic agents, polypeptides, oligonucleotides, polynucleotides, nucleoproteins, compounds modulating cell migration, compounds modulating proliferation of tissue, compounds modulating growth of tissue, vasodilating agents, anti-hematoma agents, anti-scarring agents, and combinations thereof.

14. The encasement structure according to claim 1, wherein the one or more active agents comprise one or more antibiotics.

15. The encasement structure according to claim 14, wherein the one or more antibiotics comprise rifampin and minocycline.

16. The encasement structure according to claim 1, wherein the one or more ring-shaped depots in combination comprise about 5 mg to about 20 mg of the one or more active agents.

17. The encasement structure according to claim 1, wherein the one or more ring-shaped depots comprise a first ring-shaped depot exhibiting a first active agent release period and a second ring-shaped depot exhibiting a second active agent release period, wherein the first active agent release period and the second active agent release period are different.

18. A kit comprising:
one or more encasement structures, each encasement structure comprising:
at least one sheet comprising a bioscaffold material, the at least one sheet configured to define an internal region that is sized and shaped to hold an implantable medical device therein; and
one or more ring-shaped depots comprising one or more active agents and a bioabsorbable material, wherein the one or more ring-shaped depots are configured to release the one or more active agents over a period of time, and
one or more pockets positioned on a surface of the encasement structure or within an internal region of the encasement structure configured to receive and secure the one or more ring-shaped depots.

19. A method of reducing a risk of an adverse effect associated with implanting a medical device in a subject in need thereof, the method comprising:
inserting the medical device into an encasement structure to form an encased medical device, the encasement structure comprising:
at least one sheet comprising a bioscaffold material, the at least one sheet configured to define an internal region that is sized and shaped to hold the medical device therein;
one or more ring-shaped depots associated with the at least one sheet, and
one or more pockets positioned on a surface of the encasement structure or within an internal region of the encasement structure configured to receive and secure the one or more ring-shaped depots,
wherein the one or more ring-shaped depots comprise an effective therapeutic amount of one or more active agents and a bioabsorbable material, and are configured to release the one or more active agents over a period of time;
and
implanting the encased medical device into the subject.

* * * * *